(12) United States Patent
Akiyama et al.

(10) Patent No.: US 7,773,747 B2
(45) Date of Patent: *Aug. 10, 2010

(54) ENCRYPTION APPARATUS, DECRYPTION APPARATUS, AND METHOD

(75) Inventors: Koichiro Akiyama, Tokyo (JP); Yasuhiro Goto, Hakodate (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1064 days.

This patent is subject to a terminal disclaimer.

(21) Appl. No.: 11/426,450

(22) Filed: Jun. 26, 2006

(65) Prior Publication Data

US 2007/0110232 A1 May 17, 2007

(30) Foreign Application Priority Data

Nov. 15, 2005 (JP) ............................... 2005-330516

(51) Int. Cl.
*H04L 9/30* (2006.01)
*H04L 9/14* (2006.01)

(52) U.S. Cl. ............................... 380/30; 380/28; 380/29; 380/44; 380/45; 713/171; 713/183; 713/184

(58) Field of Classification Search .................... 380/30
See application file for complete search history.

(56) References Cited

U.S. PATENT DOCUMENTS

| 6,233,340 | B1 * | 5/2001 | Sandru | 380/51 |
| 2002/0001383 | A1 * | 1/2002 | Kasahara | 380/30 |
| 2005/0271203 | A1 | 12/2005 | Akiyama et al. | |
| 2007/0061572 | A1 * | 3/2007 | Imai et al. | 713/169 |

FOREIGN PATENT DOCUMENTS

| JP | 4-88736 | 3/1994 |
| JP | 3306384 | 5/2002 |
| JP | 2005-331656 | 12/2005 |

OTHER PUBLICATIONS

Tsuyoshi Takagi; Shozo Naito; "The Multi-variable Modular Polynomial and Its Applications to Cryptography"; Dec. 16-18, 1996; Proceedings of the 7th International Symposium on Algorithms and Computation.*

(Continued)

*Primary Examiner*—Taghi T Arani
*Assistant Examiner*—Mohammad L. Rahman
(74) *Attorney, Agent, or Firm*—Oblon, Spivak, McClelland, Maier & Neustadt, L.L.P.

(57) ABSTRACT

A method whereby an encryption apparatus encrypts a message on the basis of a fibration $X(x, y, t)$ serving as a public key when private keys are two or more sections corresponding to fibration $X(x, y, t)=0$ of an algebraic surface X, the method comprises embedding plaintext M obtained by concatenating the message to a random number as the coefficients of plaintext polynomial $M(t)$ of degree $l-1$ or less, and generating encrypted text $F=E_{pk}(M, p, q, f, X)$ from the plaintext polynomial $M(t)$ by an encrypting process of performing operations including at least one of addition, subtraction, and multiplication of random polynomials $p(x, y, t)$, $q(x, y, t)$, a random irreducible polynomial $f(t)$ of degree $l$ or more, and the fibration $X(x, y, t)$ with respect to the plaintext polynomial $M(t)$.

24 Claims, 12 Drawing Sheets

OTHER PUBLICATIONS

U.S. Appl. No. 12/266,027, filed Nov. 6, 2008, Akiyama, et al.
U.S. Appl. No. 11/565,204, filed Nov. 30, 2006, Akiyama, et al.
U.S. Appl. No. 11/491,301, filed Jul. 24, 2006, Akiyama, et al.
U.S. Appl. No. 12/352,083, filed Jan. 12, 2009, Akiyama, et al.
U.S. Appl. No. 11/685,302, filed Mar. 13, 2007, Akiyama, et al.
U.S. Appl. No. 11/220,641, filed Sep. 8, 2005, Koichiro Akiyama, et al.
Koichiro Akiyama, et al., "An Algebraic Surface Public-key Cryptosystem", Technical Report of IEICE, vol. 104, No. 421, ISEC 2004-80, Nov. 2004, pp. 13-20.
U.S. Appl. No. 12/560,895, filed Sep. 16, 2009, Akiyama et al.
Japanese Office Action, dated May 25, 2010, Appln. No. 2005-330516.
Koichiro Akiyama, et al., "On Public-Key Encryption Using the Problem of Acquiring a Section of Curved Algebraic Surface," Proceedings of JISAM, 2008, Japan, Japan Society for Industrial and Applied Mathematics, Sept. 2008, pp. 7-10.
Maki Iwami, "A Reduction Attack on Algebraic Surface Public-Key Encryption," Lecture Notes in Artificial Intelligence, 2008, pp. 323-332, Computer Mathematics, $8^{th}$ Asian Symposium, ASCM, 2007, Singapore, Dec. 15-17, 2007, Revised and Invited Papers.

* cited by examiner

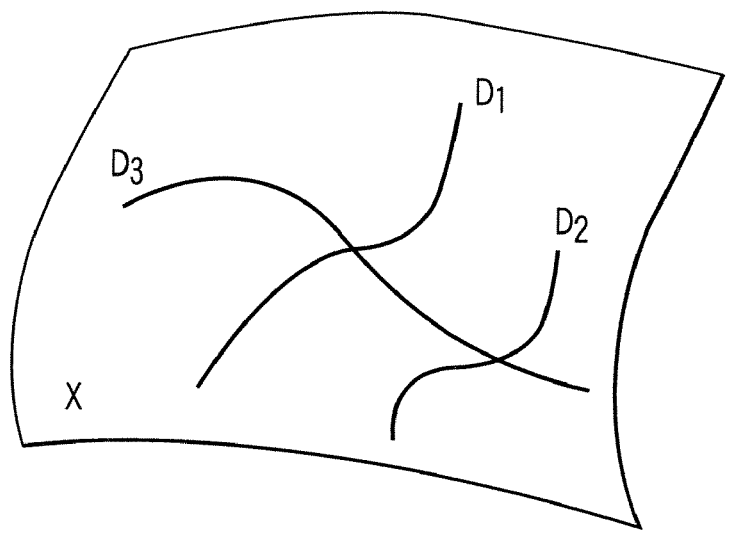
F I G. 1
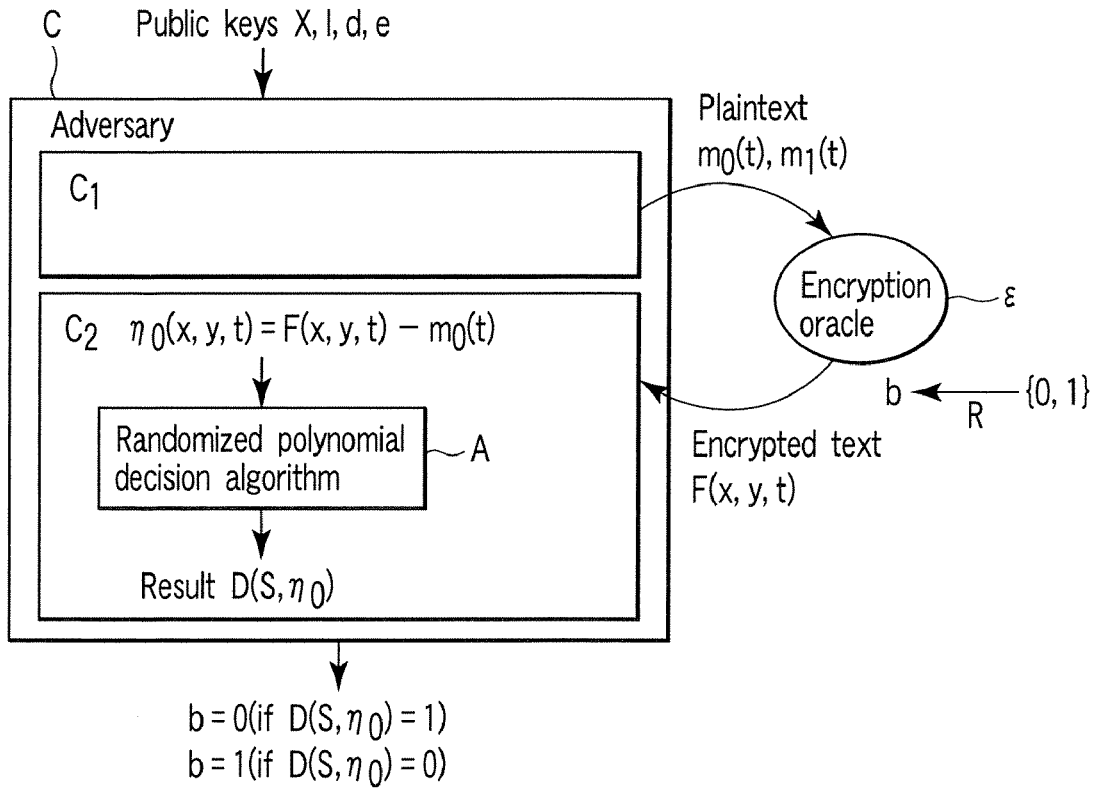
F I G. 2

ENCRYPTION APPARATUS, DECRYPTION APPARATUS, AND METHOD

CROSS-REFERENCE TO RELATED APPLICATIONS

This application is based upon and claims the benefit of priority from prior Japanese Patent Application No. 2005-330516, filed Nov. 15, 2005, the entire contents of which are incorporated herein by reference.

BACKGROUND OF THE INVENTION

1. Field of the Invention

This invention relates to an encryption apparatus, a decryption apparatus, and a method which are based on a public key cryptosystem using an algebraic surface.

2. Description of the Related Art

In a networked society, people communicate with one another by transferring a lot of information, including e-mail, over networks. In such a networked society, cryptographic technology has been widely used as a means for protecting the confidentiality and authenticity of information.

Cryptographic technology is broadly classified into secret-key cryptographic technology and public-key cryptographic technology. Secret-key cryptography, which is an encryption method based on a data shuffling algorithm, can encrypt and decrypt data at high speed, but perform secret communication and authentication communication between only the two sides sharing the secret key in advance.

For this reason, secret-key cryptography is used to encrypt information decrypted in real time after reception as mostly in pay digital broadcasting. In this case, the decryption key for the pay digital broadcasting is delivered only to subscribers by separately using a key delivery system known as a conditional access system.

On the other hand, public-key cryptography, which is an encryption method based on a mathematical algorithm, encrypts and decrypts data at slower speed than secret-key cryptography, and yet has the advantages of requiring no advance sharing of a key and enabling secret communication and authentication communication. Specifically, public-key cryptography realizes secret communication by an encrypting process using the public key of the other party and enables authentication communication by digital signature using the sender's own private key.

For Internet shopping sites opened on the Internet or the online sites of banks and securities companies, public-key cryptography is often used to protect customer information such as including credit-card numbers and addresses from eavesdropping. The reason is that secret-key cryptography is unsuitable for online sites because online sites and customers cannot necessarily share a cryptographic key in advance.

Typical public-key cryptography includes RSA cryptography and elliptic curve cryptography. RSA cryptography bases security on the difficulty of a prime factorization problem and uses modulo exponentiation operation as the encryption operation. Elliptic curve cryptography bases security on the difficulty of a discrete logarithm problem on an elliptic curve and uses point operation on an elliptic curve as the encryption operation.

In these types of public-key cryptography, a deciphering method for a specific key (public key) has been proposed, and yet a general deciphering method has been unknown. Therefore, no serious security problem has been found until now except in a deciphering method using a quantum computer explained later.

The other types of public-key cryptography include knapsack encryption and multi-degree multivariable encryption. Knapsack encryption is an encryption method which bases security on the difficulty of a knapsack problem as an NP problem. Multi-degree multivariable encryption is an encryption method which is structured using the field extended theory and bases security on the problem of finding a solution to a simultaneous equation.

However, a deciphering method has been known in most implementation forms of knapsack encryption, its security is questionable. Although a promising encryption method for multi-degree multivariable encryption has been known, it is noted that the encryption method has been avoided because of an increase in the key size. Since multi-degree multivariable encryption requires an enormous key size to avoid the deciphering method, it is viewed with suspicion.

With the advent of a quantum computer, there is a strong possibility that the aforementioned RSA cryptography and elliptic curve cryptography will be deciphered. Unlike a present-day computer, a quantum computer is capable of performing massive parallel computation making use of entanglement, a physical phenomenon in quantum mechanics. A quantum computer, which is a hypothetical computer in an experimental phase, has been researched and developed to make it a reality. In 1994, Shor showed that use of a quantum computer would make it possible to form an algorithm for solving a prime factorization problem or a discrete logarithm problem efficiently. That is, with the realization of a quantum computer, chances are high RSA cryptography based on prime factorization and elliptic curve cryptography based on a discrete logarithm problem on an elliptic curve will be deciphered.

Public-key cryptography which is secure even if a quantum computer is realized has been investigated. Quantum public-key cryptography can be taken as an example. In quantum public-key cryptography, a quantum computer generates a knapsack encryption key so powerful that a present-day computer cannot generate a key. Therefore, in quantum public-key cryptography, it is possible to construct knapsack encryption so powerful that even a quantum computer cannot decipher it. However, since a present-day computer cannot generate a key in quantum public-key cryptography, it cannot be used at present.

Multi-degree multivariable encryption is public-key cryptography capable of being realized at present and is difficult to decipher even with a quantum computer. However, since multi-degree multivariable encryption needs an enormous key size to be secure from a present-day computer, it is viewed with suspicion.

Furthermore, public-key cryptography has a larger circuit size and a longer processing time than those of secret-key cryptography. Therefore, public-key cryptography cannot be realized in a low electric power environment, such as a mobile terminal or, even if it is realized, the waiting time is long. Because of these problems, public-key cryptography realizable even in a low electric power environment has been desired.

In general, when public-key cryptography is constructed, a problem difficult to calculate, such as a prime factorization problem or a discrete logarithm problem, is found in advance. Then, public-key cryptography is constructed in such a manner that deciphering encrypted text without knowing the private key becomes equivalent to solving the problem difficult to calculate.

Even if a problem difficult to calculate is found, this does not necessarily mean it is easy to construct public-key cryptography which bases security on the problem. The reason is that, if the problem is too difficult to calculate, the problem of generating a key is also so difficult that the key cannot be generated. On the other hand, if the problem is so easy that the key can be generated, deciphering is also easy.

Accordingly, to construct public-key cryptography, it is necessary to find a problem difficult to calculate and convert the problem into a problem which makes it easy to generate a key but difficult to decipher the encrypted text. Such conversion requires high creativity. Actually, since converting a problem is difficult, very few types of public-key cryptography have been proposed.

In this situation, the inventor of this invention has proposed public-key cryptography using an algebraic surface as a public-key cryptosystem which not only may be capable of assuring security even if a quantum computer comes into being and can be realized safely even with a present-day computer but also can be realized in a low electric power environment (for example, refer to Jpn. Pat. Appln. KOKAI No. 2005-331656 or related U.S. patent application Ser. No. 11/128,283). Hereinafter, public-key cryptography using an algebraic surface is referred to as algebraic-surface cryptography (for the sake of simplicity).

The security of public-key cryptography is considered to be based on the difficulty of calculating a problem serving as grounds for security. This idea, however, does not describe an exact tracing relationship between them.

To describe an exact tracing relationship, it is necessary to model a code-breaker attack and an achieved security and prove that achieving security under the modeled attack is equivalent to the difficulty of a problem serving as grounds for security. That is, security is proved by describing an exact tracing relationship between the security of public-key cryptography and the difficulty of a problem constituting public-key cryptography.

In security proof, attack models are broadly classified into passive attack (chosen plaintext attack [CPA]) and active attack (chosen cipher attack [CCA]).

Passive attack (chosen plaintext attack [CPA]) is such an attack as repeatedly encrypts plaintext using a public key and attempts to extract information from the obtained encrypted text. Active attack (chosen cipher attack [CCA]) is such an attack as further inputs the encrypted text adaptively to a decryption apparatus and attempts to extract information on the private key from the obtained decrypted result. This means that CCA is a stronger attack than CPA.

In security proof, two criteria have been proposed for achieved security.

A first criterion is such that, after two plaintexts are encrypted, they cannot be distinguished (indistinguishable [IND]). A second criterion is such that, even if the encrypted text is manipulated in polynomial time, an encrypted text related to the original plaintext cannot be created (non-malleable [NM]).

Therefore, the criteria for security proof is expressed by a combination of an adversary attack model and achieved security as IND-CPA and NM-CCA. IND-CPA means that information used to distinguish the original plaintext from two encrypted texts under passive attack (chosen plaintext attack) cannot be extracted. NM-CCA means that information about the original plaintext cannot be obtained from the result of manipulating the encrypted text under active attack (chosen cipher attack). Presently, the criterion considered to have the highest security is IND-CCA.

On the other hand, a method of converting public-key cryptography whose security has been proved in terms of IND-CPA into a provable secure public-key cryptographic algorithm in terms of IND-CCA has been known (for example, Jpn. Pat. Appln. KOKAI No. 3306384). Therefore, if public-key cryptography whose security has been proved in terms of IND-CPA is constructed, the public-key cryptography can be converted into provable secure public-key cryptography in terms of IND-CCA.

As described above, it has been desired to construct provable secure public-key cryptography which not only may be capable of assuring security even if a quantum computer comes into being and be realized securely with a present-day computer, but also may be realized in a low electric power environment.

BRIEF SUMMARY OF THE INVENTION

According to a first aspect of the invention, there is provided an encryption apparatus for encrypting a message m in advance on the basis of a fibration $X(x, y, t)$ of an algebraic surface X serving as a public key, when private keys for decryption are two or more sections corresponding to fibration $X(x, y, t)=0$ of the algebraic surface X, the encryption apparatus comprising: an embedding device configured to embed plaintext M obtained by concatenating the message m to a random number r as the coefficients of plaintext polynomial $M(t)$ with a variable t and of degree l-1 or less; a first polynomial generating device configured to generate random polynomials $p(x, y, t)$ and $q(x, y, t)$ with three variables x, y, and t on the basis of a hash value $H(M)$ of the plaintext M; a second polynomial generating device configured to generate random one-variable irreducible polynomial $f(t)$ of degree l or more; and an encrypted text generating device configured to generate encrypted text $F=E_{pk}(M, p, q, f, X)$ from the plaintext polynomial $M(t)$ by an encrypting process of performing operations including at least one of addition, subtraction, and multiplication of the polynomials $p(x, y, t)$, $q(x, y, t)$, and $f(t)$ and the fibration $X(x, y, t)$ with respect to the plaintext polynomial $M(t)$.

According to a second aspect of the invention, there is provided an encryption apparatus for encrypting a message m in advance on the basis of a fibration $X(x, y, t)$ of an algebraic surface X serving as a public key, when private keys for decryption are two or more sections corresponding to the fibration $X(x, y, t)=0$ of the algebraic surface X, the encryption apparatus comprising: an embedding device configured to embed plaintext M obtained by concatenating the message m to a random number r in the coefficients of plaintext polynomial $M(t)$ with a variable t and of degree l-1 or less and in the coefficients of a part of the candidates for one-variable irreducible polynomial $f(t)$ of degree l or more in an assigning manner; a first polynomial generating device configured to generate random polynomials $p(x, y, t)$ and $q(x, y, t)$ with three variables x, y, and t on the basis of a hash value $H(M)$ of the plaintext M; a second polynomial generating device configured to generate the one-variable irreducible polynomial $f(t)$ by setting those with the plaintext M not embedded of the coefficients of the candidates for one-variable irreducible polynomial $f(t)$ to random values; and an encrypted text generating device configured to generate encrypted text $F=E_{pk}(M, p, q, f, X)$ from the plaintext polynomial $M(t)$ by an encrypting process of performing operations including at least one of addition, subtraction, and multiplication of the polynomials $p(x, y, t)$, $q(x, y, t)$, and $f(t)$ and the fibration $X(x, y, t)$ with respect to the plaintext polynomial $M(t)$.

According to a third aspect of the invention, there is provided a decryption apparatus for decrypting a message m from encrypted text $F=E_{pk}(M, p, q, f, X)$ on the basis of two sections $D_1$ and $D_2$ corresponding to a fibration $X(x, y, t)=0$ of an algebraic surface X serving as a private key previously held, when the encrypted text $F=E_{pk}(M, p, q, f, X)$ generated from a plaintext polynomial M(t) by an encrypting process of performing operations including at least one of addition, subtraction, and multiplication of random polynomials p(x, y, t) and q(x, y, t) with three variables x, y, and t, a random one-variable irreducible polynomial f(t) of degree l or more, and a fibration X(x, y, t) of an algebraic surface X serving as a public key, with respect to the plaintext polynomial M(t) in which plaintext M obtained by concatenating the message m to a random number r has been embedded as the coefficients of plaintext polynomial M(t) with a variable t and of degree (l−1) or less is input, the decryption apparatus comprising: a substituting device configured to substitute the sections $D_1$ and $D_2$ into the input encrypted text F to generate two one-variable polynomials $h_1(t)$ and $h_2(t)$; a polynomial subtracting device configured to subtract the one-variable polynomials $h_1(t)$ and $h_2(t)$ from one from the other to obtain the result of subtraction $\{h_1(t)-h_2(t)\}$; a factorizing device configured to factorize the result of subtraction $\{h_1(t)-h_2(t)\}$; a polynomial extracting device configured to extract an irreducible polynomial f(t) of the highest degree from the result of factorization; a dividing device configured to divide the one-variable polynomial $h_1(t)$ by the irreducible polynomial f(t) to obtain a plaintext polynomial M(t) as a remainder; a plaintext extracting device configured to extract plaintext M from the coefficients of the plaintext polynomial M(t) obtained by the dividing device; a hash computing device configured to calculate a hash value H (M) of the plaintext M on the basis of the extracted plaintext M; a polynomial generating device configured to generate polynomials p(x, y, t) and q(x, y, t) with three variables x, y, and t on the basis of the hash value H(M); an encrypted text reproducing device configured to reproduce encrypted text $F'=E_{pk}(M, p, q, f, X)$ by the same process as the encrypting process on the basis of the polynomials p(x, y, t), q(x, y, t) and f(t) and the fibration X(x, y, t); an encrypted text determination device configured to determine whether the input encrypted text F and the reproduced encrypted text F' coincide with each other; a plaintext output device configured to output the plaintext M or the message m when the result of determination has shown coincidence; and an invalidity output device configured to output encrypted text invalid information when the result of determination by the encrypted text determination device has shown the input encrypted text F and the reproduced encrypted text F' do not coincide with each other.

According to a fourth aspect of the invention, there is provided a decryption apparatus for decrypting a message m from encrypted text $F=E_{pk}(M, p, q, f, X)$ on the basis of two sections $D_1$ and $D_2$ corresponding to fibration X(x, y, t)=0 of an algebraic surface X serving as a private key previously held, when the encrypted text $F=E_{pk}(M, p, q, f, X)$ generated from a plaintext polynomial M(t) by an encrypting process of performing operations including at least one of addition, subtraction, and multiplication of random polynomials p(x, y, t) and q(x, y, t) with three variables x, y, and t, a random one-variable irreducible polynomial f(t) of degree l or more, and a fibration X(x, y, t) of an algebraic surface X serving as a public key, with respect to the plaintext polynomial M(t) in which plaintext M obtained by concatenating the message m to a random number r has been embedded in the coefficients of plaintext polynomial M(t) with a variable t and of degree (l−1) or less and in the coefficients of a part of the candidates for a one-variable irreducible polynomial f(t) of degree l or more in an assigning manner is input, the decryption apparatus comprising: a substituting device configured to substitute the sections $D_1$ and $D_2$ into the input encrypted text F to generate two one-variable polynomials $h_1(t)$ and $h_2(t)$; a polynomial subtracting device configured to subtract the one-variable polynomials $h_1(t)$ and $h_2(t)$ from one from the other to obtain the result of subtraction $\{h_1(t)-h_2(t)\}$; a factorizing device configured to factorize the result of subtraction $\{h_1(t)-h_2(t)\}$; a polynomial extracting device configured to extract an irreducible polynomial f(t) of the highest degree from the result of factorization; a dividing device configured to divide the one-variable polynomial $h_1(t)$ by the irreducible polynomial f(t) to obtain a plaintext polynomial M(t) as a remainder; a plaintext extracting device configured to extract plaintext M from the coefficients of the plaintext polynomial M(t) obtained by the dividing device and the coefficients of part of the irreducible polynomials f(t) obtained by the polynomial extracting device; a hash computing device configured to calculate a hash value H (M) of the plaintext M on the basis of the extracted plaintext M; a polynomial generating device configured to generate polynomials p(x, y, t) and q(x, y, t) with three variables x, y, and t on the basis of the hash value H(M); an encrypted text reproducing device configured to reproduce encrypted text $F'=E_{pk}(M, p, q, f, X)$ by the same process as the encrypting process on the basis of the polynomials p(x, y, t), q(x, y, t) and f(t) and the fibration X(x, y, t); an encrypted text determination device configured to determine whether the input encrypted text F and the reproduced encrypted text F' coincide with each other; a plaintext output device configured to output the plaintext M or the message m when the result of determination has shown coincidence; and an invalidity output device configured to output encrypted text invalid information when the result of determination has shown the input encrypted text F and the reproduced encrypted text F' do not coincide with each other.

According to the first to fourth aspects, since the configuration is such that private keys for decryption are two or more sections corresponding to fibration X(x, y, t)=0 of an algebraic surface X and a public key is a fibration X(x, y, t) of the algebraic surface X X(x, y, t), it is possible to construct a public-key cryptosystem which not only may be capable of assuring security even if a quantum computer comes into being and be realized securely with a present-day computer, but also may be realized in a low electric power environment.

Furthermore, according to the first to fourth aspects, since the configuration is such that plaintext polynomial M(t) of degree l−1 or less and random one-variable irreducible polynomial f(t) of degree l or more are used, it is possible to construct a provable secure public-key cryptosystem in terms of IND-CPA on the basis of [Proof 5] described later. IND-CPA means that it is impossible to extract information used to distinguish the original plaintext from two encrypted texts under passive attack.

In addition, according to the first to fourth aspects, since the configuration is such that plaintext M obtained by concatenating a message M to a random number r is embedded as the coefficients of plaintext polynomial M(t) and is encrypted by generating polynomials p(x, y, t) and q(x, y, t) on the basis of the hash value H(M) of M and, in decryption, the hash value is H(M) is calculated from the decrypted text M, polynomials p(x, y, t) and q(x, y, t) are generated by the same means as in encryption, and it is determined that the reproduced encrypted text F' and the input encrypted text F coincide with each other, a secure public-key cryptosystem in terms of IND-CPA is converted into a provable secure public-key cryptosystem in terms of IND-CCA. IND-CCA means that it is impossible to obtain information about the original plaintext from the result of manipulating the encrypted text under active attack.

Consequently, according to the first to fourth aspects, it is possible to construct a provable secure public-key cryptosystem in terms of IND-CCA.

BRIEF DESCRIPTION OF THE SEVERAL VIEWS OF THE DRAWING

FIG. 1 is a pattern diagram to help explain an algebraic surface in each embodiment of the present invention;

FIGS. 2 and 3 are pattern diagrams to help explain security proof in each embodiment of the present invention;

DETAILED DESCRIPTION OF THE INVENTION

Figure 3:
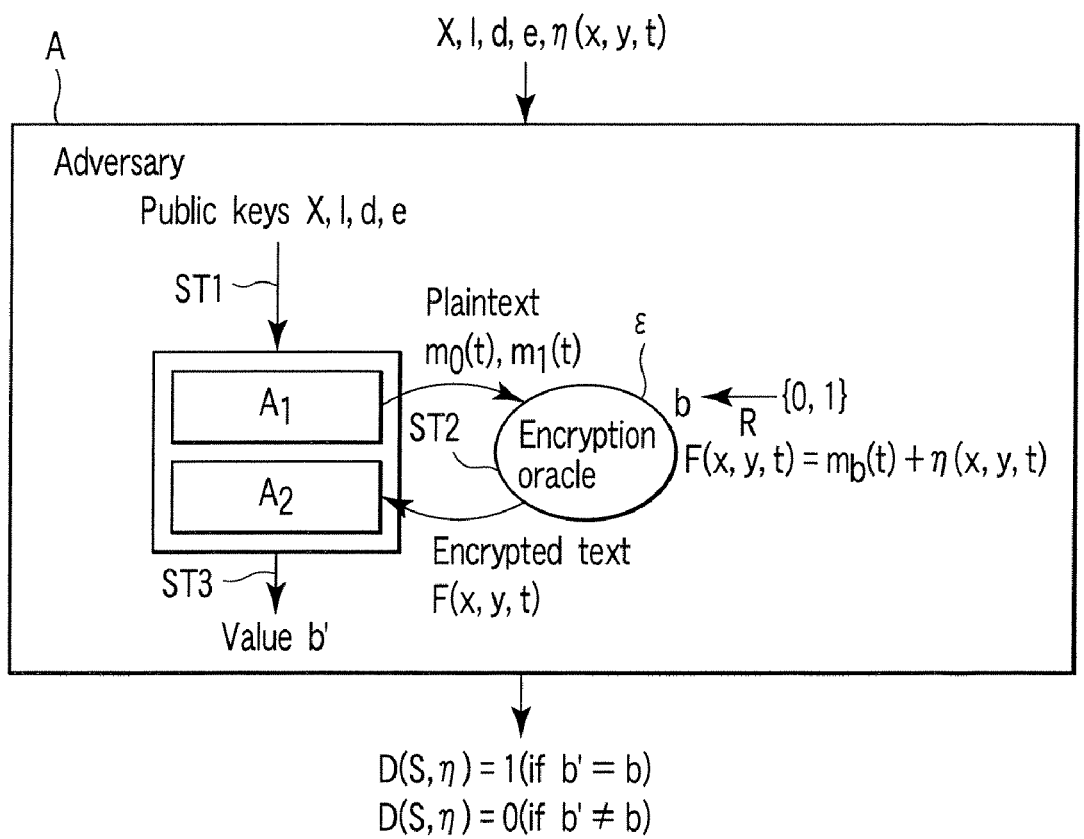

Before embodiments of the present invention are explained using the accompanying drawings, an algebraic surface and a section finding problem on an algebraic surface will be described as premises for the embodiments. A section finding problem is a problem related to a randomized polynomial decision problem serving as a basis for the embodiments.

Premises for Embodiments

An algebraic surface described in the invention is defined as those having two-dimensional freedom degree in the sets of solutions to simultaneous (algebraic) equations defined on field K. For example, since simultaneous equations on a field K expressed by the following equations (1) have three equations restricting five variables and are of two-dimensional freedom degree, they produce an algebraic surface:

$$f_1(x,y,z,v,w)=0$$

$$f_2(x,y,z,v,w)=0$$

$$f_3(x,y,z,v,w)=0 \quad (1)$$

As shown in equation (2), a space defined as a set of solutions to an algebraic equation of three variables on K is also an algebraic surface on K:

$$f(x,y,z)=0 \quad (2)$$

Equations (1) and equation (2) are definitional equations for an algebraic surface in an affine space. In the case of equation (2), a definitional equation for an algebraic surface in a projective space is $f(x, y, z, w)=0$.

Since in the embodiments, an algebraic surface is not used in a projective space, the definitional equation of an algebraic surface is set as equations (1) or equation (2). Even if the definitional equation for an algebraic surface is expressed in a projective space, the present invention will hold without modification.

An algebraic curve is defined as those having a one-dimensional degree of freedom in the sets of solutions to simultaneous (algebraic) equations defined on field K. Therefore, for example, it is defined as the following equation:

$$g(x,y)=0$$

In the embodiments, since only an algebraic surface expressed by one equation like equation (2) is dealt with, equation (2) is hereinafter dealt with as if it were a definitional equation for an algebraic surface.

A field is a set where addition, subtraction, multiplication, and division can be performed freely. Real numbers, rational numbers, and complex numbers fall under this category. A set including indivisible elements excluding zero, such as integers or matrixes does not fall under this category. In a field, there is a field composed of a finite number of elements called a finite field. For example, for prime p, modulo p coset Z/p Z produces a field. Such a field is called a prime field and represented by $F_p$. Another finite field is a field $F_q$ ($q=p^r$) having a prime's power number of elements. For the sake of simplicity, only prime field $F_p$ is dealt with in the embodiments. Generally, p in prime field $F_p$ is called characteristic of prime field $F_p$.

The same thing holds for a general finite field in the present invention, since a trivial modification is made to the general finite field. Since messages have to be embedded in the form of digital data, public-key cryptography is often constructed on a finite field. In the embodiments, an algebraic surface defined on a finite field (particularly a prime field) $F_p$ is treated.

On an algebraic surface $f(x, y, z)=0$, there are usually a plurality of algebraic curves as shown in FIG. 1. Such algebraic curves are called factors on an algebraic surface.

Generally, the problem of finding a (nontrivial) factor when a definitional equation for an algebraic surface is given is a difficult problem unsolved in modern mathematics. A general method of solving the problem has been unknown excluding such a primitive method as round-robin processing. Particularly in the embodiments, an algebraic surface defined in a finite field is handled. However, an algebraic surface defined in a finite field has fewer clues to find a factor than an algebraic surface defined in an infinite field (a field composed of an infinite number of elements) such as a rational field. For this reason, the problem of finding a factor on an algebraic surface defined in a finite field is a more difficult problem.

In the embodiments, this problem is referred to as a factor finding problem on an algebraic surface or simply as a factor finding problem. Then, public-key cryptography which bases security on a factor finding problem on an algebraic surface is constructed.

An algebraic surface in the following form is known as a fibration of algebraic surface X and represented as Xt:

Of algebraic surface X on field K: $f(x, y, z)=0$, there is a curve defined as $h(x, y, t)=0$ and expressed as $(x, y, t)=(u_x(t), u_y(t), t)$ called a section where x, y are parametrized using t. Hereinafter, for the sake of simplicity, when it is clear that an algebraic surface is a fibration, it is represented simply as X.

An algebraic curve obtained by substituting element $t_0$ of field K into parameter t in a fibration of algebraic surface X is called a fiber and represented as $Xt_0$. Here, both a fiber and a section are factors of algebraic surface Xt.

Generally, when a fibration of an algebraic surface is given, a fiber corresponding to the fibration is determined immediately (by substituting an element of the field into t). On the other hand, it is very difficult to find a section corresponding to the fibration. In this sense, it can be said that a fiber is a trivial factor and a section is a nontrivial factor.

Public-key cryptography of the invention bases security on the problem of finding a section when fibration Xt of algebraic surface X is given, among the factor finding problems on an algebraic surface.

To find a section from the fibration, only the method following procedures (i) to (iv) below has been known.

(i) On the assumption that section $(u_x(t), u_y(t), t)$ is expressed as $\deg u_x(t) < r_x$, $\deg u_y(t) < r_y$,
set $u_x(t)$ and $u_y(t)$ as follows:

$$u_x(t) = \alpha_0 + \alpha_1 t + \ldots + \alpha_{r_x-1} t^{r_x-1}$$

$$u_y(t) = \beta_0 + \beta_1 t + \ldots + \beta_{r_y-1} t^{r_y-1}$$

(ii) Substituting $u_x(t)$ and $u_y(t)$ into $X(x, y, t)=0$ gives the following:

$$X(u_x(t), u_y(t), t) = \sum_i c_i t^i = 0$$

(iii) Expanding the left-hand side of the above equation causes the coefficient of $t^i$ to be expressed by a function $C_i(\alpha_0, \ldots, \alpha_{r_x-1}, \beta_0, \ldots, \beta_{r_y-1})$ of $\alpha_0, \ldots, \alpha_{r_x-1}, \beta_0, \ldots, \beta_{r_y-1}$, thereby establishing the following simultaneous equation system:

$$\begin{cases} c_0(\alpha_0, \ldots, \alpha_{r_x-1}, \beta_0, \ldots, \beta_{r_y-1}) = 0 \\ c_1(\alpha_0, \ldots, \alpha_{r_x-1}, \beta_0, \ldots, \beta_{r_y-1}) = 0 \\ \vdots \\ c_{r_x+r_y-2}(\alpha_0, \ldots, \alpha_{r_x-1}, \beta_0, \ldots, \beta_{r_y-1}) = 0 \end{cases}$$

(iv) Solve the simultaneous equation system. Hereinafter, the degree in section $(u_x(t), u_y(t), t)$ is defined as the maximum value of $\deg u_x(t)$ and $\deg u_y(t)$.

Hereinafter, explanation will be given about a concrete configuration related to public-key cryptography of the present invention whose security can be proved on the basis of a randomized polynomial decision problem associated with a section finding problem on an algebraic surface.

First Embodiment

General Description

Public keys in a first embodiment of the present invention are the following five:
1. Characteristic p of a prime field
2. Fibration of an algebraic surface on $F_p$: $X(x, y, t)=0$
3. Degree l of one-variable irreducible polynomial f(t) on $F_p$ where $\deg_r X(x,y,t) < l$ (3-0)

4. The maximum degree d of polynomials $u_x(t)$, $u_y(t)$, $v_x(t)$, $v_y(t)$ in a section (serving as a private key)
5. The highest exponent e of x, y of three-variable polynomial p(x, y, t)

Private keys are the following two sections $D_1$ and $D_2$:
1. Section of algebraic surface X on $F_p$: $D_1$: $(x, y, t)=(u_x(t), u_y(t), t)$
2. Section of algebraic surface X on $F_p$: $D_2$: $(x, y, t)=(v_x(t), v_y(t), t)$ These can be determined easily by a method described later (or a key generating method).

Next, the outline of an encrypting process will be described. In an encrypting process, a message to be encrypted (hereinafter, referred to as plaintext) is block-split as follows:

$$m = m_0 \| m_1 \| \ldots \| m_{l-1}$$

These are used as the coefficients of plaintext polynomial m(t) and are embedded as shown in the following equation (a plaintext embedding process):

$$m(t) = m_{l-1} t^{l-1} + \ldots + m_1 t + m_0$$

where to make m(t) a polynomial on $F_p$, each mi ($0 \leq i \leq l-1$) has to be set so as to be an element of $F_p$. That is, plaintext m is split on the basis of the bit length of p so as to satisfy the following expression:

$$0 \leq m_i \leq p-1$$

where plaintext m is an integer and is configured by, for example, reading a character code string representing a message as an integer.

Next, random polynomials p(x, y, t), q(x, y, t) on $F_p$ are determined randomly. At this time, p(x, y, t) is determined so as to satisfy the following conditions (3) and (4):

$$\alpha > \deg_x X(x,y,t)$$

$$\beta > \deg_y X(x,y,t)$$

For the above exponents $\alpha$ and $\beta$, the term $x^\alpha y^\beta$ is included (3)

$$(\deg_x p(x,y,t) + \deg_y p(x,y,t))d + \deg_t p(x,y,t) < l \quad (4)$$

Here, suppose $\deg_x$, $\deg_y$, $\deg_t$ represent the degree of x, y, t in each individual polynomial, respectively. Moreover, q(x, y, t) is determined so as to meet the following condition (5):

$$\deg_t q(x,y,t) < l \quad (5)$$

Next, a random one-variable irreducible polynomial f(t) of degree l on $F_p$ is determined. An irreducible polynomial is a polynomial which cannot be factorized any further. It is known that the irreducibility decision of a one-variable polynomial on a finite field is easy. From the above equation m(t), p(x, y, t), q(x, y, t), f(t) and fibration X(x, y, t) of algebraic surface X serving as a public key, encrypted text F(x, y, t) is calculated using the following equation (6):

$$F(x,y,t) = m(t) + f(t)p(x,y,t) + X(x,y,t)q(x,y,t) \quad (6)$$

The recipient who has received encrypted text F(x, y, t) performs decryption using his or her own private keys $D_1$, $D_2$ as follows. First, sections $D_1$, $D_2$ are substituted into encrypted text F(x, y, t). Here, substituting sections $D_1$, $D_2$ into algebraic surface X(x, y, t) gives the following two equations $h_1(t)$, $h_2(t)$ because $X(u_x(t), u_y(t), t)=0$, $X(v_x(t), v_y(t), t)=0$:

$$h_1(t) = F(u_x(t), u_y(t), t) = m(t) + f(t)p(u_x(t), u_y(t), t)$$

$$h_2(t) = F(v_x(t), v_y(t), t) = m(t) + f(t)p(v_x(t), v_y(t), t)$$

Next, subtracting the latter from the former gives the following equation (7):

$$h_1(t)-h_2(t)=f(t)\{p(u_x(t),u_y(t),t)-p(v_x(t),v_y(t),t)\} \quad (7)$$

Then, $h_1(t)-h_2(t)$ is factorized and the factor having the maximum degree is determined to be f(t). For the factor of the maximum degree to be f(t), it is a necessary and sufficient condition that, if the degree of f(t) is l, such p(x, y, t) as meets condition (8) is selected:

$$\deg(p(u_x(t),u_y(t),t)-p(v_x(t),v_y(t),t))<l \quad (8)$$

To meet this expression, p(x, y, t) has to be selected so as to satisfy both of the conditions (9):

$$\deg(p(u_x(t),u_y(t),t))<l$$

$$\deg(p(v_x(t),v_y(t)t))<l \quad (9)$$

However, since the section is kept secret from the sender, degree l of f(t) is made sufficiently large and the maximum degree d of polynomials $u_x(t)$, $u_y(t)$, $v_x(t)$, $v_y(t)$ serving as the individual elements of the section is determined to be a public key, which is then laid open to the public. That is, to determine p(x, y, t), conditional expression (4) has only to be satisfied. Since the factorization of one-variable polynomial is easy, the factorization of $h_1(t)-h_2(t)$ can be performed within a sufficiently effective time. Dividing $h_1(t)$ by the obtained f(t) (taking note of the degree of m(t) being lower than degree l of f(t)) gives:

$$h_1(t)=m(t)+f(t)p(u_x(t),u_y(t),t)$$

Therefore, plaintext polynomial m(t) is obtained.

From the obtained plaintext polynomial m(t), plaintext m can be obtained by the reverse of the plaintext embedding process. It is notable that m(t) is unique as a remainder. If it is not unique, there are a plurality of candidates for plaintext polynomial m(t), which makes it difficult to identify a true plaintext polynomial. The reason why m(t) is unique is that, since the division algorithm holds in one-variable polynomial ring F[t] including $h_1(t)$ as in an integer, the quotient and remainder as a result of dividing one-variable polynomial by one-variable polynomial are unique. It is known that the division algorithm does not hold for polynomials of two or more variables.

Lastly, a key creating method in the first embodiment will be explained. In the first embodiment, a key is generated by selecting sections $D_1$, $D_2$ randomly and calculating fibrations corresponding to them. To give two sections simultaneously to the generated algebraic surface, the following device is necessary.

For the sake of simplicity, a key generating method will be described using an elliptic surface Et in the algebraic surfaces as an example. An elliptic surface can be defined as an algebraic surface which has a fibration expressed by the following equation:

$$Et: y^2=x^3+a(t)x+b(t)$$

where a(t) and b(t) are one-variable polynomials.

First, characteristic p of a prime field is determined. At this time, even if p is small, there is no problem with security. Set sections $D_1$ and $D_2$ as follows:

$$D_1: (x,y,t)=(u_x(t),u_y(t),t),$$

$$D_2: (x,y,t)=(v_x(t),v_y(t),t)$$

Substituting these into elliptic surface Et gives:

$$u_y(t)^2=u_x(t)^3+a(t)u_x(t)+b(t)$$

$$v_y(t)^2=v_x(t)^3+a(t)v_x(t)+b(t)$$

Subtracting the latter from the former in such a manner that the latter's left-hand side is subtracted from the former's left-hand side and the latter's right-hand side is subtracted from the former's right-hand side causes b(t) to disappear, thereby giving:

$$u_y(t)^2-v_y(t)^2-(u_x(t)^3-v_x(t)^3)=a(t)(u_x(t)-v_x(t))$$

To make a(t) polynomial, for example, the following is a sufficient condition:

$$u_x(t)-v_x(t)|v_y(t)$$

Making use of this, a key can be generated by an algorithm described below. Here, the representation k1(t)|k2(t) means that polynomial $k_2(t)$ is divisible by polynomial $k_1(t)$. First, two polynomials satisfying $\lambda_x(t)|\lambda_y(t)$ are selected at random.

A method of finding such a combination of polynomials concretely is realized by, for example, giving $\lambda_x(t)$ at random and calculating $\lambda_y(t)=c(t)\lambda_x(t)$ using random polynomial c(t) to find $\lambda_y(t)$.

Next, select polynomial $\lambda_x(t)$ at random and calculate $u_x(t)$ using the following:

$$u_x(t)-v_x(t)=\lambda_x(t)$$

Similarly, select polynomial $\lambda_y(t)$ at random and calculate $u_y(t)$ using the following:

$$u_y(t)-v_y(t)=\lambda_y(t)$$

Using $u_x(t)$, $v_x(t)$, $u_y(t)$, $v_y(t)$, polynomial a(t) can be calculated by calculating the following equation (10):

$$a(t)=\{u_y(t)^2-v_y(t)^2-(u_x(t)^3-(v_x(t)^3)\}/(u_x(t)-v_x(t)) \quad (10)$$

Furthermore, on the basis of a(t), b(t) is obtained from the following equation (11):

$$b(t)=u_y(t)^2-u_x(t)^3-a(t)u_x(t) \quad (11)$$

The key generating method is not limited to an elliptic surface. For instance, the key generating method can be carried out by assuming such a definitional equation as $y^2=x^5+a(t)x+b(t)$ on an algebraic surface other than an elliptic surface.

The setting of specific parameters l, d, and e will be explained later.

Hereinafter, it will be explained that the algorithm of the first embodiment is provable and secure in terms of IND-CPA on the assumption that a randomized polynomial decision problem described later is difficult. First, a decrypting algorithm fails if equation (7) is as follows:

$$\{p(u_x(t),u_y(t),t)-p(v_x(t),v_y(t),t)\}=0$$

However, this failure occurs with only a negligible probability for e, a public key.

[Proposition 1] For the maximum value e of exponent of x and y in fibration X(x, y, t)=0 of an algebraic surface defined on a finite field Fp having at least two sections differing from each other $$(x,y,t) = \begin{cases} (u_x(t), u_y(t), t) \\ (v_x(t), v_y(t), t) \end{cases}$$

and a three-variable polynomial p(x, y, t), the probability that equation (12) holds is $1/p^{e+1}$:

$$p(u_x(t),u_y(t),t)=p(v_x(t),v_y(t),t) \quad (12)$$

[Proof 1] Suppose $u_x(t) \neq v_x(t)$ in sections $(u_x(t), u_y(t), t)$, $(v_x(t), v_y(t), t)$ differing from each other $X(x, y, t)$ has. If $u_x(t)=v_x(t)$, it follows that $u_y(t) \neq v_y(t)$. Then, the following discussions can be made similarly on the assumption that $u_y(t) \neq v_y(t)$.

Now, for such x as meets equation (12), suppose there is $p(x, y, t)$ which takes the maximum value e of exponent. At this time, $p(x, y, t)+g(x)$ does not meet equation (12) for one-variable polynomial $g(x)$ ($\neq 0$) of an arbitrary $(e-1)$ degree or less on $F_p$. The reason is that if $p(x, y, t)+g(x)$ meets equation (12), $g(u_x(t))=g(v_x(t))$ holds, with the result that, when finite field $F_p$ is expanded to an infinite field, there are an infinite numbers of solutions and therefore $u_x(t)=v_x(t)$ holds. The equation generated this way never coincides with a polynomial obtained by a similar means from another $p(x, y, t)$ satisfying equation (12). Actually, for other $p_1(x, y, t)$ and $p_2(x, y, t)$ fulfilling equation (12) and one-variable polynomials $g_1(x)$ and $g_2(x)$, suppose the following holds:

$$p_1(x,y,t)+g_1(x)=p_2(x,y,t)+g_2(x) \qquad (13)$$

At this time, it follows that $$p_1(x,y,t)-p_2(x,y,t)=g_2(x)-g_1(x)$$

Here, if $g_1(x)=g_2(x)$, then $p_1(x, y, t)=p_2(x, y, t)$, which conflicts with the above. Therefore, $g_1(x) \neq g_2(x)$. If $g(x)=g_2(x)-g_1(x)$, $g(u_x(t))=g(v_x(t))$ is satisfied because of the nature of $p_1(x, y, t)=p_2(x, y, t)$, with the result that $u_x(t)=v_x(t)$ holds. Therefore, there is no combination of $(p_1(x, y, t), g_1(t))$, $(p_2(x, y, t), g_2(t))$ differing from each other which satisfy equation (13). If $p(x, y, t)$ takes the maximum value of exponent of y, the proof holds at it is by changing the roles of x and y.

From what has been described above, at least a $p^{e+1}$ number of polynomials not meeting equation (12) can be caused to correspond without overlaps to three-variable polynomials $p(x, y, t)$ on one $F_p[x, y, t]$ meeting equation (12). Therefore, the probability that $p(x, y, t)$ meeting equation (12) will occur is no more than $1/p^{e+1}$.

The security of algebraic surface cryptography depends on a randomized polynomial decision problem related to algebraic surface cryptography described below.

[Definition 1] Randomized polynomial decision problem related to algebraic surface cryptography When fibration $X(x, y, t)=0$ of an algebraic surface having two different sections of degree d or less defined on $F_p$ and the natural number 1 are given, the problem of determining whether a three-variable polynomial $A(x, y, t)$ belongs to the following set S is known as a randomized polynomial decision problem related to algebraic surface cryptography:

$S(X,l,d)=\{Y(x,y,t)|\exists p(x,y,t),q(x,y,t)(\in F_p[x,y,t]),$ $p(x,y,t)$: satisfies condition(3)(4)

$q(x,y,t)$: satisfies condition(5) $\exists f(t)(\in F_p[t])$: irreducible, $\deg f \geq l \; Y(x,y,t)=f(t)p(x,y,t)+X(x,y,t)q(x,y,t)\}$ If it is clear that it is related to algebraic surface cryptography, it is simply referred to as a randomized polynomial decision problem.

A randomized polynomial decision problem is the problem of determining whether a given polynomial $g(x, y, t)$ is written in the form of $$f(t)p(x,y,t)+X(x,y,t)q(x,y,t) \qquad (14)$$

when fibration $X(x, y, t)=0$ of an algebraic surface having two different sections of degree d or less and the minimum degree l of an irreducible polynomial $f(t)$ are given. Suppose polynomial $g(x, y, t)$ can be written in two or more ways in the form of expression (14). In this case, since an attacker (or problem solver) has only to find one from a plurality of writing forms, the randomized polynomial decision problem becomes easier that much. However, such a thing cannot happen and polynomial $g(x, y, t)$ can be written uniquely as described below, as long as $p(x, y, t)$ satisfies conditions (3) and (4) and $q(x, y, t)$ fulfils condition (5).

[Proposition 2] When polynomial $g(x, y, t)$ can be expressed as $$f(t)p(x,y,t)+X(x,y,t)q(x,y,t)$$

using fibration $X(x, y, t)=0$ of an algebraic surface having two different sections of degree d or less, the minimum degree l of an irreducible polynomial $f(t)$, $p(x, y, t)$ meeting condition (3), and $q(x, y, t)$ meeting condition (5), the way of writing polynomial $g(x, y, t)$ is unique.

[Poof 2] Suppose there is $g(x, y, t)$ which can be written in two ways as shown in equations (15):

$$g(x, y, t) = f_1(t)p_1(x, y, t) + X(x, y, t)q_1(x, y, t) \qquad (15)$$
$$= f_2(t)p_2(x, y, t) + X(x, y, t)q_2(x, y, t)$$

From the supposition, $X(x, y, t)$ is an algebraic surface having two different sections of degree d or less. For this reason, if the individual sections are $(u_x(t), u_y(t), t)$ and $(v_x(t), v_y(t), t)$, the following equations hold:

$$g(u_x(t), u_y(t), t) - g(v_x(t), v_y(t), t) = f_1(t)(p_1(u_x(t), u_y(t), t) - p_1(v_x(t), v_y(t), t))$$
$$= f_2(t)(p_2(u_x(t), u_y(t), t) - p_2(v_x(t), v_y(t), t))$$

Here, since eliminating the negligible probability from proposition 1 gives $$p_1(u_x(t),u_y(t),t)-p_1(v_x(t),v_y(t),t) \neq 0$$

it follows that $p_2(u_x(t),u_y(t),t)-p_2(v_x(t),v_y(t),t) \neq 0$

Since $p_1(x, y, t)$ and $p_2(x, y, t)$ fulfill condition (4), it follows that $f_2(t)=cf_1(t)$ in terms of degree, where c is an element of finite field $F_p$. Therefore, performing subtraction on a same-side member basis in equations (15) and reflecting the preceding expression in the result gives the following equation:

$$f_1(t)(p_1(x,y,t)-cp_2(x,y,t))=X(x,y,t)(q_2(x,y,t)-q_1(x,y,t))$$

Here, since algebraic surface $X(x, y, t)$ is irreducible, it follows that $(f(t), X(x, y, t))=1$ and therefore $Fp[x, y, t]$ is a unique solution integral domain. Therefore, the following expression holds:

$$f_1(t)|q_2(x,y,t)-q_1(x,y,t)$$

Here, from condition (5) for $q(x, y, t)$, the following holds:

$$\deg_t q_2(x,y,t)-q_1(x,y,t) < \deg f_1(t)$$

This gives $q_1(x, y, t)=q_2(x, y, t)$.

Accordingly, $p_1(x, y, t)=p_2(x, y, t)$ holds.

It follows that $c=1$ or that $f_1(t)=f_2(t)$

Therefore, the two expressions coincide with each other.

As described above, to solve a randomized polynomial decision problem, it is necessary to determine whether there is a solution to a problem which has a unique solution. For this reason, a randomized polynomial decision problem cannot be solved easily. Of course, if a section finding problem is solved easily, then a randomized polynomial decision problem will be solved easily. However, a method of solving a randomized polynomial decision problem has not been known except for solving a section finding problem. Therefore, a randomized polynomial decision problem is considered to be a sufficiently difficult problem.

Furthermore, from the proposition, the result of decrypting public-key cryptography of the present invention is proved to be unique as follows.

[Lemma 1] For fibration $X(x, y, t)=0$ of an algebraic surface having at least two different sections of degree d or less and randomized polynomial $G(x, y, t)$ corresponding to the minimum degree l of irreducible polynomial $f(t)$, $m(t)+G(x, y, t)$ does not become a randomized polynomial, where $m(t)$ is a one-variable polynomial of degree l−1 or less other than 0.

[Proof 3] If $m(t)+G(x, y, t)$ is a randomized polynomial, equation (16) holds:

$$m(t) + G(x, y, t) = f_1(t)p_1(x, y, t) + X(x, y, t)q_1(x, y, t) \quad (16)$$
$$= m(t) + f_2(t)p_2(x, y, t) + X(x, y, t)q_2(x, y, t)$$

Here, from the supposition, $X(x, y, t)$ is an algebraic surface having two sections. Therefore, if the sections are $(u_x(t), u_y(t), t)$ and $(v_x(t), v_y(t), t)$, the following equation is given:

$$G(u_x(t), u_y(t), t) - G(v_x(t), v_y(t), t) = f_1(t)(p_1(u_x(t), u_y(t), t) -$$
$$p_1(v_x(t), v_y(t), t))$$
$$= f_2(t)(p_2(u_x(t), u_y(t), t) -$$
$$p_2(v_x(t), v_y(t), t))$$

Here, since eliminating the negligible probability from the proposition gives $$p_1(u_x(t),u_y(t),t)-p_1(v_x(t),v_y(t),t) \neq 0$$

it follows that $$p_2(u_x(t),u_y(t),t)-p_2(v_x(t),v_y(t),t) \neq 0$$

Since $p_1(x, y, t)$ and $p_2(x, y, t)$ satisfy condition (4), it follows that $f_2(t)=cf_1(t)$ in terms of degree.

Accordingly, substituting $(u_x(t), u_y(t), t)$ and the preceding equation into equation (16) gives $$m(t)=f_1(t)\{p_1(u_x(t),u_y(t),t)-cp_2(u_x(t),u_y(t),t)\}$$

However, this gives $\deg m(t) \geq l$, which is contradictory. Therefore, $m(t)+G(x, y, t)$ does not become a randomized polynomial.

[Theorem 1]

Fibration $X(x, y, t)=0$ of an algebraic surface having at least two sections, randomized polynomial $G(x, y, t)$ corresponding to the minimum degree l of irreducible polynomial $f(t)$ and the maximum degree d of one-variable polynomials included in the two sections, and $m(t)+G(x, y, t)$ expressed by one-variable polynomial $m(t)$ of degree l−1 or less are unique.

[Proof 4]

Suppose one-variable polynomials $m_1(t)$, $m_2(t)$ and randomized polynomials $G_1(x, y, t)$, $G_2(x, y, t)$ which satisfy $\deg m_1(t)$, $\deg m_2(t) < l$ have the following relationship:

$$m_1(t)+G_1(x,y,t)=m_2(t)+G_2(x,y,t)$$

At this time, $m_1(t)-m_2(t)+G_1(x, y, t)$ becomes a randomized polynomial.

Then, from lemma 1, it follows that $m_1(t)=m_2(t)$

This leads to $G_1(x, y, t)=G_2(x, y, t)$

Therefore, the representation is unique.

Next, on the basis of these results, the security of public-key cryptography of the present invention will be proved.

[Definition 2] IND-CPA

Let $\Pi := (K, E, D)$ be public-key cryptography and a probabilistic algorithm to attack this be $A:=(A_1, A_2)$. For this algorithm, setting a security parameter as $k \in N$, the following is defined:

$$Adv_{A,\Pi}^{ind-cpa}(k):=2Pr[(pk,sk) \leftarrow K(1^k); (x_0,x_1,s) \leftarrow A_1$$
$$(pk); b \leftarrow_R \{0,1\}; y \leftarrow E_{pk}(x_b): A_2(x_0,x_1,s,y)=b]-1$$

If $Adv_{A,\Pi}^{ind-cpa}(k)$ can be ignored for k in any probabilistic attack algorithm A, public-key cryptography $\Pi$ is said to be secure in terms of IND-CPA.

Here, the definition of IND-CPA will be explained in detail. $Adv_{A,\Pi}^{ind-cpa}(k)$ indicates the probability that public-key cryptography having parameter k defined by $\Pi$ will be broken by algorithm A in the sense of indistinguishable (IND) under chosen plaintext attack (CPA).

Parameter k is an index representing the difficulty of a problem on which the security of public-key cryptography is based. In public-key cryptography of the present invention, when p is fixed, d or l becomes a parameter. Actually, as seen in a parameter setting method described later, d may be considered to be a parameter because l is a function of d.

Here, CPA means subjecting plaintext to an encrypting program and adaptively constructing plaintext by reference to the output encrypted text. Algorithm $A (=(A_1, A_2))$ is based on the assumption that CPA can be executed. As described in detail later, since the algorithm has two algorithms $A_1$ and $A_2$ in broad terms, it is written as $A (=(A_1, A_2))$.

Next, IND, a criterion for security to be achieved, will be explained. IND means being capable of predicting the original message from the encrypted text obtained following the procedures (i) to (iv) below:

(i) A pair of a public key and a private key which are generated using a key generating algorithm K so as to meet parameter K is output.

$$(pk,sk) \leftarrow K(1^k)$$

(ii) After algorithm $A_1$ knowing only public key pk of the key pair adaptively encrypts plaintext several times, two messages $m_0$, $m_1$ are selected.

$$(x_0,x_1,s) \leftarrow A_1(pk);$$

(iii) Suppose a third party called an encryption oracle is caused to select either $m_0$ or $m_1$ and encrypt it and obtain encrypted text y.

$$b \leftarrow R\{0,1\}; y \leftarrow E_{pk}(x_b):$$

(iv) Whether the corresponding message is $m_0$ or $m_1$ is predicted from the obtained encrypted text y by using algorithm $A_2$.

$$A_2(x_0,x_1,s,y)=b$$

On the other hand, in IND, since the answer is 0 or 1, if an answer is made haphazardly, the right solution is given with probability ½. Thus, the degree of deviation of the accuracy rate (success probability) from ½ becomes a problem.

Specifically, if probability $Adv_{A,\Pi}^{ind-cpa}(k)$ obtained by doubling probability $$Pr[(pk,sk) \leftarrow K(1^k); (x_0,x_1,s) \leftarrow A_1(pk); b \leftarrow_R \{0,1\}; y \leftarrow$$
$$E_{pk}(X_b): A_2(x_0,x_1,s,y)=b]$$

and subtracting 1 from the resulting probability is negligible, it is acceptable.

Negligible probability means that probability decreases exponentially with respect to parameter k. For example, when a parameter is d, $1/p^l$ or $1/p^d$ can be said to be negligible probability.

When a randomized polynomial decision problem is difficult, the security of algebraic surface cryptography can be proved as follows.

[Theorem 2] That algebraic surface cryptography is secure in terms of IND-CPA is equivalent to that a randomized polynomial decision problem cannot be solved in polynomial time.

[Proof 5] If algebraic surface cryptography Π is secure in terms of IND-CPA, this means that a randomized polynomial decision problem cannot be solved in polynomial time with non-negligible probability. Suppose there is algorithm A capable of solving a randomized polynomial decision problem in polynomial time with non-negligible probability $Adv_A$. In this case, adversary $C=(C_1, C_2)$ capable of solving algebraic surface cryptography Π in terms of IND-CPA can be configured as shown in FIG. 2. When X, l, d, e given as public keys are input, $C_1$ does some processing using the public keys and outputs two plaintexts $m_0(t)$, $m_1(t)$ to encryption oracle $\in$. Encryption oracle $\in$ selects one $m_b(t)$ from the input plaintexts, encrypts it using the public keys, and returns the encrypted text F(x, y, t) to adversary C. Adversary C generates $$\eta_0(x,y,t) = F(x,y,t) - m_0(t)$$

for the received encrypted text F(x, y, t) and obtains result $D(\eta_0, S)$ using algorithm A. Here, $D(\eta, S)$ is a function taking $\{0, 1\}$ as a range of value, with 1 when polynomial η belongs to set S of randomized polynomials and 0 when it does not belong to set S. Adversary C outputs b=1 when the value of $D(\eta_0, S)$ is 0 and b=0 when the value of $D(\eta_0, S)$ is 1. Since the above process is based on the assumption that algorithm A ends in polynomial time, it is completed in polynomial time.

Here, success probability $Adv_{A,\Pi}^{ind-cpa}(k)$ can be evaluated as follows:

$$Adv_{C,\Pi}^{ind-cpa}(k) = Pr[D(\eta_0, S) = 0 \mid b=1] + Pr[D(\eta_0, S) = 1 \mid b=0])$$
$$= Pr[D(\eta_0, S) = 0 \wedge b=1]/Pr[b=1] +$$
$$Pr[D(\eta_0, S) = 1 \wedge b=0]/Pr[b=0])$$

Where since $Pr[b=1] = Pr[=0] = 1/2$
it follows that $$= 2(Pr[D(\eta_0,S)=0 \wedge b=1] + Pr[D(\eta_0,S)=1 \wedge b=0])$$

Here, from theorem 1, it is unlikely that $\eta_0(x, y, t)$ becomes randomized $m(t)_b$ or polynomial $m(t)_b$. Accordingly, the probability that event $\{D(\eta_0, S)=0 \wedge b=1\} \vee \{D(\eta_0, S)=1 \wedge b=0\}$ will occur coincides with the success probability of algorithm A. Thus, it follows that $=2Adv_A$.

Consequently, $Adv_{A,\Pi}^{ind-cpa}(k)$ is non-negligible probability.

Next, explanation will be given about the following: if a randomized polynomial decision problem cannot be solved in polynomial time with non-negligible probability, algebraic surface cryptography Π is secure in terms of IND-CPA. Suppose algebraic surface cryptography Π is not secure in terms of IND-CPA. At this time, there is adversary $A=(A_1, A_2)$ capable of breaking algebraic surface cryptography Π in terms of IND-CPA. Assuming adversary A, it will be proved that there is algorithm A capable of solving a randomized polynomial decision problem in polynomial time with non-negligible probability. Specifically, when randomized polynomial set S (=S(X, l, d)) and polynomial η (x, y, t) are given, algorithm A determines whether η (x, y, t) belongs to S as shown in FIG. 3. In FIG. 3, public-key cryptography Π using parameters X, l, d for a set of randomized polynomials as public keys is considered and X, l, d are input as public keys to adversary $A=(A_1, A_2)$ (ST1). $A_1$ outputs plaintexts $m_0(t)$, $m_1(t)$ to encryption oracle $\in$. Encryption oracle $\in$ selects b from set $\{0,1\}$ randomly and generates encrypted text F(x, y, t) $(=m_b(t)+\eta(x, y, t))$, thereby performing simulation (ST2). Receiving the encrypted text F(x, y, t) generated by the encryption oracle (at $A_2$), adversary A processes it by using an algorithm which ends within polynomial time and outputs b' (ST3). Here, if b'=b, then $D(\eta, S)=1$. If b'≠b, then $D(\eta, S)=0$. It is clear that algorithm A ends within polynomial time. Next, $Adv_A$ is evaluated as follows. Here, G is defined as $G=Fp[x, y, t]$ and R is defined as $R=G-S$.

$$Adv_A = Pr[D(\eta, S) = 1 \mid \eta \in S] - Pr[D(\eta, S) = 1 \mid \eta \in G]$$
$$= Pr[b' = b \mid \eta \in S] - Pr[b' = b \mid \eta \in G]$$
$$= Pr[b' = 1 \mid b = 1 \wedge \eta \in S]/2 + Pr[b' = 0 \mid b = 0 \wedge \eta \in S]/2 -$$
$$Pr[b' = b \mid \eta \in G]$$
$$= Pr[b' = 1 \mid b = 1 \wedge \eta \in S]/2 + (1 - Pr[b' = 1 \mid b = 0 \wedge \eta \in S])/2 -$$
$$Pr[b' = b \mid \eta \in G]$$
$$= (Pr[b' = 1 \mid b = 1 \wedge \eta \in S] - Pr[b' = 1 \mid b = 0 \wedge \eta \in S])/2 +$$
$$1/2 - Pr[b' = b \mid \eta \in G]$$
$$= Adv_{A,\Pi}^{ind-cpa}(k)/2 + 1/2 - Pr[b = b' \mid \eta \in G]$$
$$= Adv_{A,\Pi}^{ind-cpa}(k)/2 + 1/2 - Pr[b = b' \wedge \eta \in G]/Pr[\eta \in A]$$
$$= Adv_{A,\Pi}^{ind-cpa}(k)/2 + 1/2 - (Pr[b = b' \mid \eta \in S]Pr[\eta \in S] +$$
$$Pr[b = b' \mid \eta \in R]Pr[\eta \in R])$$

Here, when η∈R (that is, η∉S), polynomial η 1(x, y, t) exists in set S and the following may hold:

$$m_b(t) + \eta(x,y,t) = m_{\bar{b}}(t) + \eta_1(x,y,t)$$

where $\bar{b}$ means not b. That is, if b=0, then $\bar{b}$=1. If b=1, $\bar{b}$=0. In this case, since it inevitably follows that b≠b', this leads to $$Pr[b = b' \mid \eta \in R] \leq 1/2$$

Therefore, it follows that $$= Adv_{A,\Pi}^{ind-cpa}(k)(1 - Pr[\eta \in S])/2 + 1/2 - Pr[\eta \in S]/2 - (1 - Pr[\eta \in S])/2$$
$$= Adv_{A,\Pi}^{ind-cpa}(k)(1 - Pr[\eta \in S])/2$$

Here, from lemma 1, m(t)+η (x, y, t) (where 0≦deg m(t)<l) never fails to belong to R for polynomial η (x, y, t) belonging to set S. From theorem 1, m(t)+η (x, y, t) is represented uniquely. Accordingly, a set of polynomials belonging to set R corresponds to polynomial η (x, y, t) belonging to set S in a one-to-one correspondence:

$$\{m(t) + \eta(x,y,t) \mid m(t) \in F_p[t] \wedge \deg m(t) < l\}$$

Since any two do not intersect with each other in these sets, this leads to $$Pr[\eta \in SJ] \leq 1/p^l$$

Therefore, it follows that $$\geq Adv_{A,\Pi}^{ind\text{-}cpa}(l-1/p^l)/2$$

Here, since $p \geq 2$, $l \geq 1$, it follows that $$\geq Adv_{A,\Pi}^{ind\text{-}cpa}/4$$

Therefore, $Adv_A$ is non-negligible.

[Parameter Setting Method]

In this paragraph, explanation will be given about a concrete parameter setting method related to public-key cryptography of the present invention where security is reduced to a randomized polynomial decision problem in the above discussion.

The parameters of public-key cryptography of the present invention are size p of finite field $F_p$ and the maximum degree d of sections. In addition, from condition (4), it is seen that the degree l(d) of one-variable polynomial f(t) should be set as:

$$l(d) = (2d+1)e(d)+1 \quad (17)$$

Moreover, the maximum exponent e(d) of x and y in three-variable polynomial p(x, y, t) is a parameter for failure probability of decryption. Failure probability is $1/p^e(d)+1$ from proposition 1. To set failure probability to $2^n$, it is necessary to satisfy the following expression:

$$(|p|-1)(e(d)+1) > n$$

where |p| represents the bit length of p.

Concrete Configuration of the First Embodiment

Figure 4:
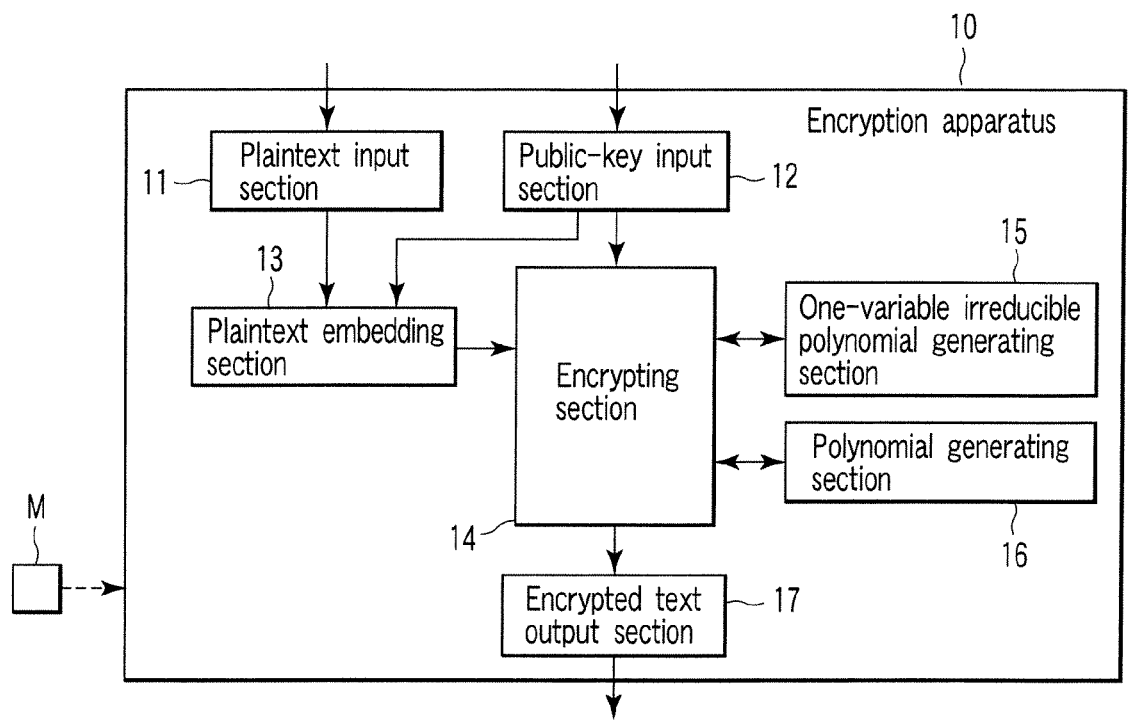
FIG. 4 is an overall configuration diagram of an encryption apparatus according to a first embodiment of the present invention.
Figure 5:
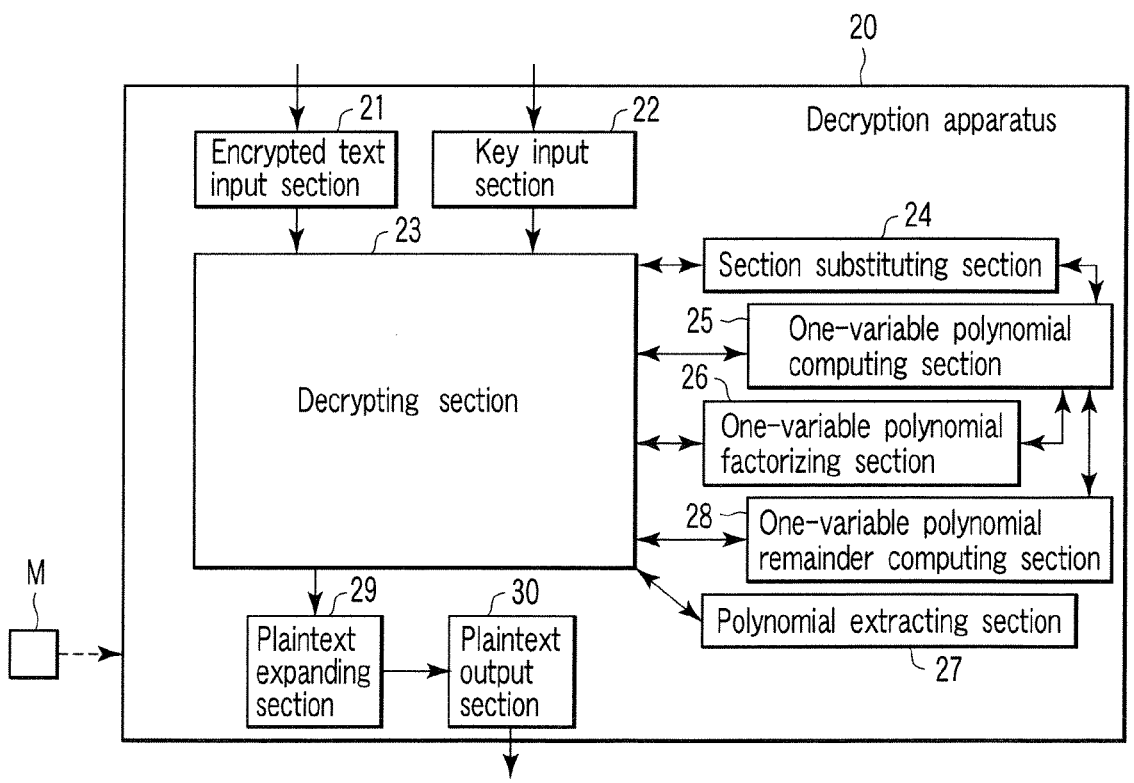
FIG. 5 is an overall configuration diagram of a decryption apparatus according to the first embodiment.

Next, a concrete configuration of the encryption apparatus and decryption apparatus in public-key cryptography of the present invention and its algorithm will be explained. FIG. 4 is an overall configuration diagram of the encryption apparatus of the first embodiment. FIG. 5 is an overall configuration diagram of the decryption apparatus of the first embodiment.

Each of the encryption apparatus 10 and decryption apparatus 20 can be practiced by hardware configuration or a combinational configuration of hardware resources and software. As software for the combinational configuration, a program is used which is preinstalled in the computer of the corresponding apparatus from a network or a storage medium M and realizes the function of the corresponding apparatus.

As shown in FIG. 4, the encryption apparatus 10 includes a plaintext input section 11, a public-key input section 12, a plaintext embedding section 13, an encrypting section 14, a one-variable irreducible polynomial generating section 15, a polynomial generating section 16, and an encrypted text output section 17. The decryption apparatus 10 has a memory (not shown) (or hardware resources) and is capable of reading and writing input data, output data, and data during processing from and into the individual section 11 to 17 as needed.

The plaintext input section 11 has the function of holding externally input plaintext (message) m temporarily in a memory and sending the plaintext m to the plaintext embedding section 13.

The public-key input section 12 has the function of holding an externally input public key temporarily in a memory and sending the public key to the plaintext embedding section 13 and the encrypting section 14.

The plaintext embedding section 13 has the function of embedding plaintext m as the coefficient of plaintext polynomial m(t) with a variable of t and of degree l−1 or less on the basis of plaintext m received from the plaintext input section 11 and the public key received from the public-key input section 12 and the function of sending the obtained plaintext polynomial m(t) to the encrypting section 14.

Figure 6:
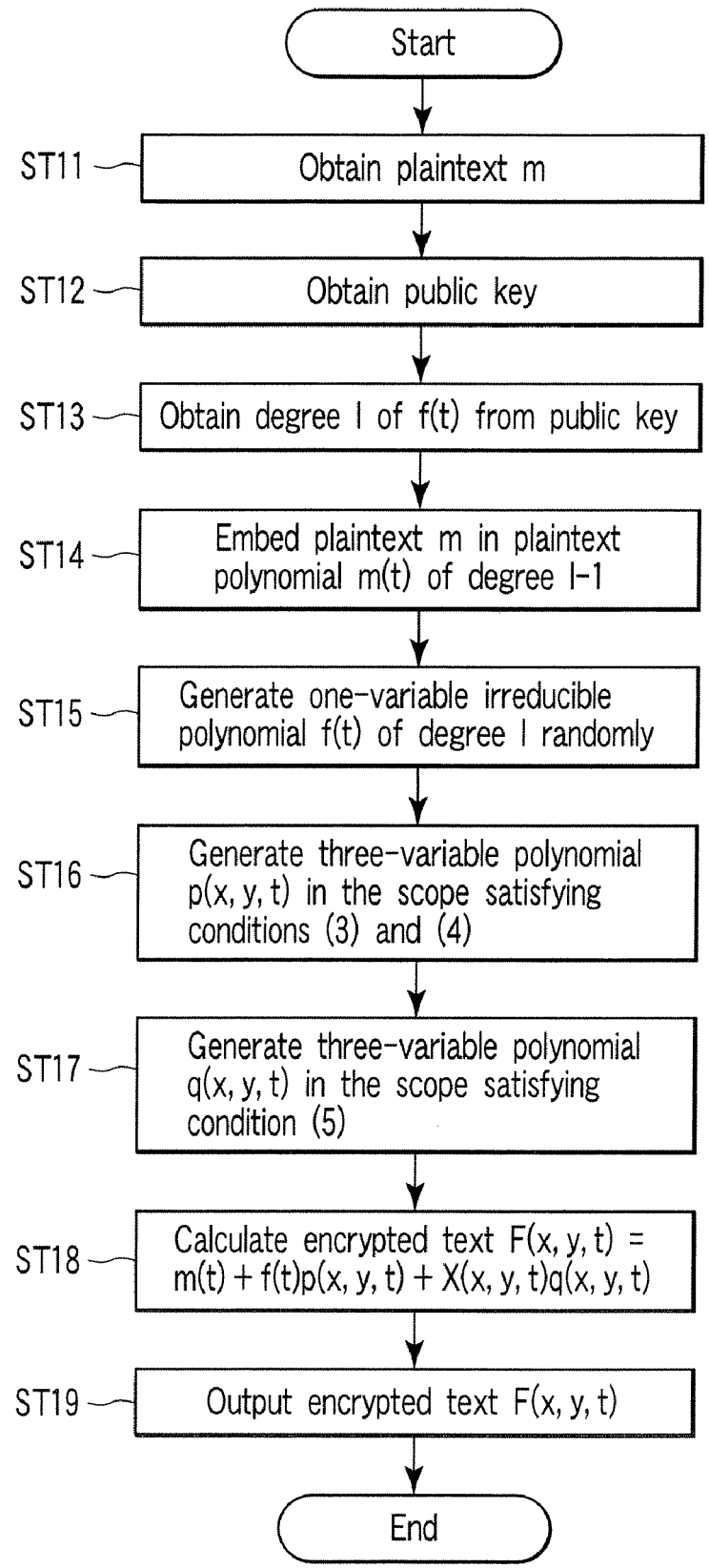
FIG. 6 is a flowchart to help explain the flow of processing in the encryption apparatus of the first embodiment.

On the basis of the plaintext polynomial m(t) received from the plaintext embedding section 13 and the public keys X(x, y, t), p, l, d, e received from the public-key input section 12, the encrypting section 14 controls the individual sections 15 to 17 in the subsequent stages so as to carry out the operations shown in FIG. 6. The encrypting section 14 particularly has the function of generating encrypted text F(x, y, t) ($=E_{pk}$(m, p, q, f, X)) from plaintext polynomial m(t) by an encrypting process of performing at least one of the addition, subtraction, and multiplication of individual polynomials p(x, y, t), q(x, y, t), and f(t) and fibration X(x, y, t) with respect to the plaintext polynomial m(t).

The one-variable irreducible polynomial generating section 15 is controlled by the encrypting section 14 and has the function of generating random one-variable irreducible polynomial f(t) of degree l or more.

The one-variable polynomial generating section 16 is controlled by the encrypting section 14 and has the function of generating random polynomials p(x, y, t), q(x, y, t) with three variables x, y, t.

The encrypted text output section 17 has the function of outputting encrypted text F(x, y, t) generated by the encrypting section 14.

As shown in FIG. 5, the decryption apparatus 20 includes an encrypted text input section 21, a key input section 22, a decrypting section 23, a section substituting section 24, a one-variable polynomial computing section 25, a one-variable polynomial factorizing section 26, a polynomial extracting section 27, a one-variable polynomial remainder computing section 28, a plaintext expanding section 29, and a plaintext output section 30. The decryption apparatus 20 has a memory (not shown) (or hardware resources) and is capable of reading and writing input data, output data, and data during processing from and into the individual section 21 to 30 as needed.

The encrypted text input section 21 has the function of holding externally input encrypted text F temporarily in a memory and sending the encrypted text F to the decrypting section 23.

The key input section 22 has the function of holding an externally input public key temporarily in a memory and sending the public key to the decrypting section 23.

Figure 7:
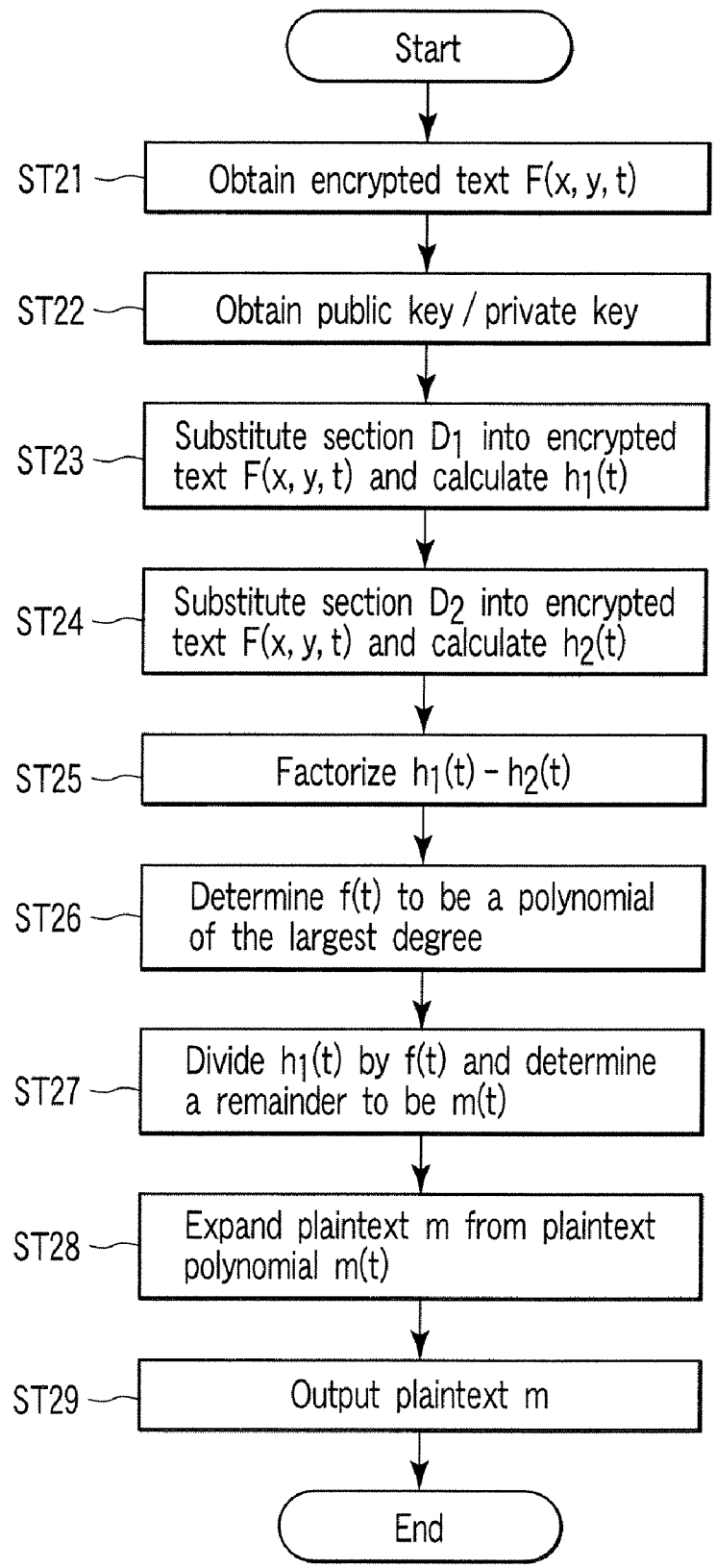
FIG. 7 is a flowchart to help explain the flow of processing in the decryption apparatus of the first embodiment.

The decrypting section 23 has the function of controlling the individual sections 24 to 29 in the subsequent stages so as to carry out the operations shown in FIG. 7.

The section substituting section 24 is controlled by the decrypting section 23 and has the function of substituting sections D1, D2 into the input encrypted text F to generate two one-variable polynomials $h_1(t)$, $h_2(t)$.

The one-variable polynomial computing section 25 is controlled by the decrypting section 23 and has the function of subtracting one-variable polynomial $h_2(t)$ from one-variable polynomial $h_1(t)$ to produce the result of subtraction $\{h_1(t)-h_2(t)\}$.

The one-variable polynomial factorizing section 26 is controlled by the decrypting section 23 and has the function of factoring the result of subtraction $\{h_1(t)-h_2(t)\}$.

The polynomial extracting section 27 is controlled by the decrypting section 23 and has the function of extracting irreducible polynomial f(t) of the largest degree from the result of factorization.

The one-variable polynomial remainder computing section 28 is controlled by the decrypting section 23 and has the function of dividing one-variable polynomial $h_1(t)$ by irreducible polynomial f(t) and obtaining plaintext polynomial m(t) as a remainder.

The plaintext expanding section 29 has the function of extracting plaintext m from the coefficient of plaintext polynomial m(t) received from the decrypting section 23.

The plaintext output section 30 has the function of outputting plaintext m received from the plaintext expanding section 29.

Next, the operation of the encryption apparatus and decryption apparatus configured as described above will be explained using the flowcharts of FIGS. 6 and 7.

(Encrypting Process: FIG. 6)

When receiving plaintext (or message) m from the plaintext input section 10 (ST11) and public keys X(x, y, t), p, l, d, e from the public-key input section 12 (ST12), the encryption apparatus 10 starts an encrypting process. Of the input public keys, degree l of one-variable irreducible polynomial f(t) and characteristic p of the prime field are acquired (ST13) and l and p are sent to the plaintext embedding section 13.

The plaintext embedding section 13 divides plaintext m sent from the plaintext input section 11 into pieces of a bit length l shorter than the bit length of characteristic p. For example, when p=17, the plaintext embedding section 13 divides plaintext m into 4-bit pieces.

Here, suppose plaintext m is
m=0x315763ef25c04c792ef151 in hexadecimal.

In this case, the plaintext embedding section 13 divides plaintext m in hexadecimal representation at 4-bit intervals and embeds the results as the coefficients of plaintext polynomial m(t) as shown in the following equation (ST14):

$$m(t) = 3t^{21} + t^{20} + 5t^{19} + 7t^{18} + 6t^{17} + 3t^{16} + 15t^{15} + 11t^{14} + 2t^{13} + 5t^{12} +$$
$$12t^{11} + 0t^{10} + 4t^9 + 12t^8 + 7t^7 + 9t^6 + 2t^5 + 14t^4 + 15t^3 + t^2 + 5t + 1$$

The plaintext embedding section 13 transmits plaintext polynomial m(t) to the encrypting section 14. The public-key input section 12 transmits public keys X(x, y, t), p, l, d, e to the encrypting section 14.

The encrypting section 14 transmits l and p of the public keys to the one-variable irreducible polynomial generating section 15.

The one-variable irreducible polynomial generating section 15 generates one-variable polynomial f(t) of degree l randomly (ST15) and sends back the obtained one-variable irreducible polynomial f(t) to the encrypting section 14. Here, an irreducible polynomial is generated by generating a one-variable polynomial of degree l at random and repeating an irreducibility decision on $F_p$ until the obtained one-variable polynomial becomes an irreducible polynomial.

Receiving the one-variable irreducible polynomial f(t), the encrypting section 14 transmits p, l, d, e to the polynomial generating section 16. On the basis of p, l, d, e, the polynomial generating section 16 generates random three-variable polynomial p(x, y, t) in such a manner that each term of the three-variable polynomial satisfies relational expression (3) about degree and condition (4) (ST16). There are two generating methods: one is to generate a three-variable polynomial randomly, then check whether it meets the two conditions, and if it does not meet them, generate a three-variable polynomial randomly again; and the other is to put restrictions on a three-variable polynomial to be generated so as to meet the two conditions. Since sufficiently various coefficient can be taken in the scope of conditions (3) and (4) in either method, the generation of a three-variable polynomial is completed within executable time. The polynomial generating section 16 transmits the obtained three-variable polynomial p(x, y, t) to the encrypting section 14.

Receiving the three-variable polynomial p(x, y, t), the encrypting section 14 transmits p, l, d, e of the public keys to the polynomial generating section 16. On the basis of p, l, d, e, the polynomial generating section 16 generates random polynomial q(x, y, t) with three variables so as to meet condition (5) (ST17) and transmits the obtained three-variable polynomial p(x, y, t) to the encrypting section 14.

Using m(t), f(t), p(x, y, t), q(x, y, t) obtained by the above processes, the encrypting section 14 calculates encrypted text F(x, y, t) according to equation (6), thereby expanding it (ST18). The encrypting section 14 outputs the encrypted text at the encrypted text output section 17 (ST19) and completes the encrypting process. The encrypting section 14 may modify the encrypted text according to a predetermined format as needed and output the resulting text at the encrypted text output section 17.

(Decrypting Process: FIG. 7)

When receiving encrypted text F(x, y, t) from the encrypted text input section 21 (ST21) and public keys X(x, y, t), p and private keys from the key input section 22 (ST22), the decryption apparatus 20 starts a decrypting process. The private keys are two sections $D_1$, $D_2$. The acquired encrypted text and key information are sent to the decrypting section 23.

The decrypting section 23 transmits encrypted text F(x, y, t) and section $D_1$ to the section substituting section 24. The section substituting section 24 substitutes $D_1$ into F(x, y, t) and uses the one-variable polynomial computing section 25 as needed to obtain $h_1(t)$ (ST23). Here, the one-variable polynomial computing section 25 carries out four operations of the one-variable polynomial. The obtained $h_1(t)$ is transmitted from the section instituting section 24 to the decrypting section 23.

Similarly, the decrypting section 23 transmits encrypted text F(x, y, t) and section $D_2$ to the section substituting section 24. The section substituting section 24 substitutes $D_2$ into F(x, y, t) to obtain $h_2(t)$ (ST24). The obtained $h_2(t)$ is transmitted from the section instituting section 24 to the decrypting section 23.

The decrypting section 23 transmits $h_1(t)$, $h_2(t)$ to the one-variable polynomial computing section 25, which performs subtraction. The one-variable polynomial computing section 25 transmits the result of subtraction $\{h_1(t)-h_2(t)\}$ to the decrypting section 23.

The decrypting section 23 transmits the result of subtraction $\{h_1(t)-h_2(t)\}$ to the one-variable polynomial factorizing section 26, which factorizes it (ST25). The one-variable polynomial factorizing section 26 determines irreducible polynomial f(t) as a factor of the largest degree from the result of factorization (ST26) and transmits the irreducible polynomial f(t) to the decrypting section 23.

Next, the decrypting section 23 transmits f(t), $h_1(t)$ to the one-variable polynomial remainder computing section 28.

The one-variable polynomial remainder computing section 28 divides $h_1(t)$ by f(t) to calculate plaintext polynomial m(t) as a remainder (ST27) and transmits the plaintext polynomial m(t) to the decrypting section 23.

The decrypting section 23 transmits m(t) to the plaintext expanding section 29. The plaintext expanding section 29 expands plaintext m from the plaintext polynomial m(t) and transmits the obtained plaintext m to the plaintext output section 30. The plaintext output section 30 outputs the plaintext m (ST29). Then, the decryption apparatus 20 completes the decrypting process.

As described above, with the first embodiment, it is possible to construct provable secure public-key cryptography which not only may be capable of assuring security even if a quantum computer comes into being and be realized securely with a present-day computer, but also may be realized in a low electric power environment.

To supplement the explanation, in the first embodiment, since the private keys for decryption are two or more sections corresponding to fibration $X(x, y, t)=0$ of algebraic surface $X$ and the public key is fibration $X(x, y, t)$ of algebraic surface $X$, it is possible to construct a public-key cryptosystem which not only may be capable of assuring security even if a quantum computer comes into being and be realized securely with a present-day computer, but also may be realized in a low electric power environment.

Furthermore, with the first embodiment, since plaintext polynomial $m(t)$ of degree $l-1$ or less and random one-variable irreducible polynomial $f(t)$ of degree $l$ or more are used, it is possible to construct provable secure public-key cryptography in terms of IND-CPA on the basis of the aforementioned proof 5.

Variation of the First Embodiment

A first variation of the first embodiment is such that the size of public keys is reduced by a configuration where p, l, d, e in the public keys of the first embodiment are made fixed parameters. Of course, only a part of these parameters may be made fixed.

In this variation, since a part of the parameters are fixed, if sufficiently large l, d, e are obtained, a desired public key $X(x, y, t)$ can be generated, although restrictions are placed in generating keys.

A second variation of the first embodiment is such that equation (6) used for encryption is modified. For example, even if equation (6) is modified to $F(x, y, t)=m(t)-f(t)p(x, y, t)-X(x, y, t)q(x, y, t)$, encryption and decryption can be similarly performed and therefore similar security is provable. As described above, encryption equation can be modified within the scope of the spirit or essential character of the invention, with the result that it is sufficiently possible to change the decrypting process accordingly.

A third variation of the first embodiment is a method of embedding plaintext m also in one-variable irreducible polynomial $f(t)$. In the aforementioned embodiment, the method of generating $f(t)$ randomly has shown. However, since in the public keys of the present invention, $f(t)$ is difficult to determine without a private key, a method of embedding plaintext information even in $f(t)$ is feasible.

When plaintext m is embedded in $f(t)$, plaintext of larger size can be encrypted at a time. Since the embedded result $f(t)$ has to be made an irreducible polynomial, it is necessary to determine specific coefficients beforehand in such a manner that they include random coefficients. There are a lot of irreducible polynomials. Therefore, even if plaintext m is embedded in part of the coefficients, irreducible polynomials can be obtained in most cases. If they cannot be obtained, it is possible to increase the search range by raising the degree of $f(t)$. Even if such modification is made, similar security is provable.

A fourth variation of the first embodiment is a method of eliminating parameter e as the maximum exponent of x, y in three-variable polynomial $p(x, y, t)$ from the public keys. As shown in proposition 1, parameter e is the exponent in representing the failure probability of decryption. Specifically, since the exponent is not a direct characteristic of security, if a rule to perform encryption again (by changing $p(x, y, t)$) at the time of encryption failure is set, an embodiment of removing e from the public keys is possible. This embodiment not only makes the public key size smaller but also makes it unnecessary to limit the generation of $p(x, y, t)$ more than necessary.

Second Embodiment

Next, a second embodiment of the present invention will be explained. The public keys and private keys in the second embodiment are the same as those in the first embodiment. Public-key cryptography of the second embodiment assures higher security than that of the first embodiment which assures security (IND-CPA) against passive attack. Specifically, public-key cryptography of the second embodiment assures security (IND-CCA) even against active attack.

Public-key cryptography of the first embodiment guarantees security in terms of IND-CPA. In contrast, the second embodiment configures secure public-key cryptography in terms of IND-CCA by using the conversion described in Jpn. Pat. No. 3306384.

The technical content written in Jpn. Pat. No. 3306384 will be explained briefly. When there is public-key cryptography $\Pi$ (K, E, D) including secure random elements in terms of IND-CPA, this is converted into public-key cryptography $\overline{\Pi}(K, E, \overline{D})$ including random elements, thereby realizing public-key cryptography satisfying IND-CCA. Here, K, E, and D represent a key generation algorithm, an encryption algorithm, and a decryption algorithm. An encrypting process is carried out concretely as follows:

$$\overline{E}(m,r)=E(m\|r,H(m\|r))$$

Specifically, the public keys encrypted on the basis of plaintext m and random elements r (corresponding to three-variable polynomials $p(x, y, t)$, $q(x, y, t)$ and the coefficient of each factor in one-variable polynomial $f(t)$) are converted into those in a method of performing encryption using m‖r as plaintext and the hash value H(m‖r) of m‖r as a random element.

Accordingly, in the decrypting process, after decryption is performed by the same decrypting process as in the first embodiment, m, the true message, is extracted from plaintext m‖r and the hash value H(m‖r) of plaintext m‖r is calculated. Thereafter, encrypted text F' (x, y, t) using H(m‖r) as a random element is reproduced and is compared with encrypted text F(x, y, t). If they coincide with each other, the decrypted plaintext m is output. If they do not coincide with each other, the result of decryption is not output. The message that it is an invalid encrypted text is output.

However, since the conversion described in Jpn. Pat. No. 3306384 gives a certain structure to encrypted text to maintain security in a positive sense, it is difficult to construct encrypted text strongly randomized as in the first embodiment. Accordingly, the encryption method written in Jpn. Pat. No. 3306384 is based on a weak algorithm (in terms of randomization). For example, in the method of Jpn. Pat. No. 3306384, it is impossible to configure a secure method by determining in advance the types of terms of the polynomials used in $p(x, y, t)$ and $q(x, y, t)$, that is, terms $x^i y^j t^k$ and $x^l y^m t^n$ appearing in the following equations, and performing only such a simple conversion as allocates random elements H(m‖r) to coefficients $a_{i,j,k}$ and $b_{l,m,n}$:

$$p(x, y, t) = \sum_{i,j,k} a_{i,j,k} x^i y^j t^k$$

$$q(x, y, t) = \sum_{l,m,n} b_{l,m,n} x^l y^m t^n$$

In contrast, the second embodiment provides a concrete method of performing conversion while keeping security.

Concrete Configuration of the Second Embodiment

Next, the second embodiment will be explained. Since the public keys and private keys of the second embodiment are the same as those of the first embodiment, explanation of them will be omitted. Key generation is also the same as in the first embodiment.

Figure 8:
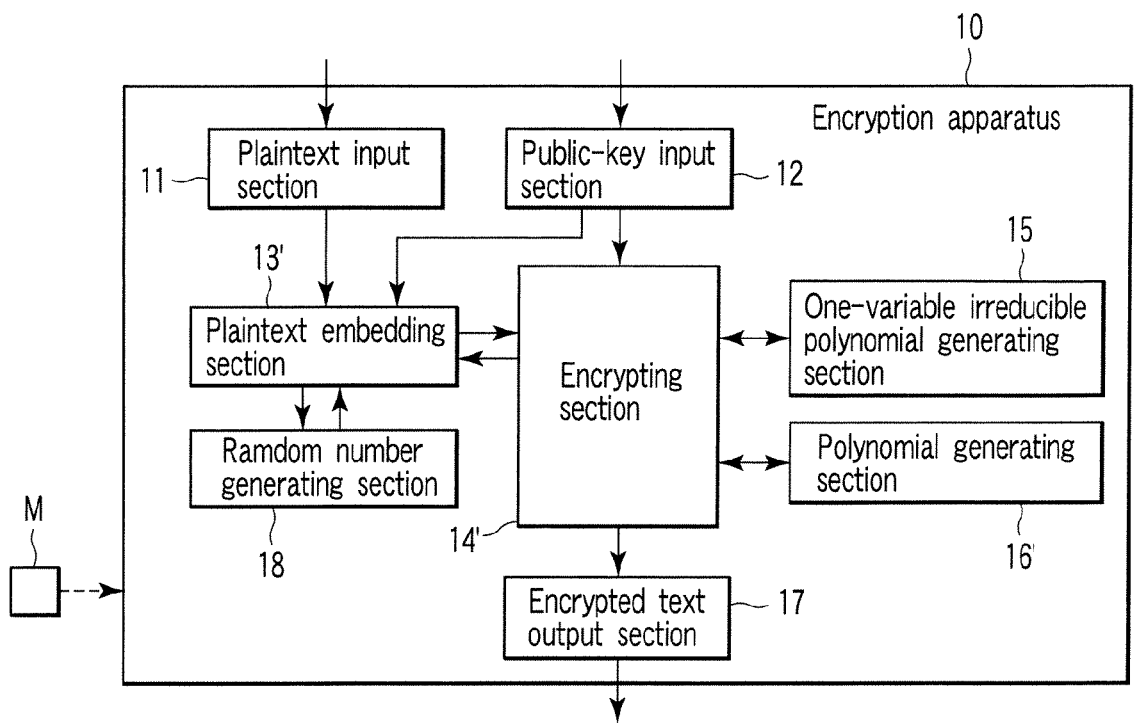
FIG. 8 is an overall configuration diagram of an encryption apparatus according to a second embodiment of the present invention.
Figure 9:
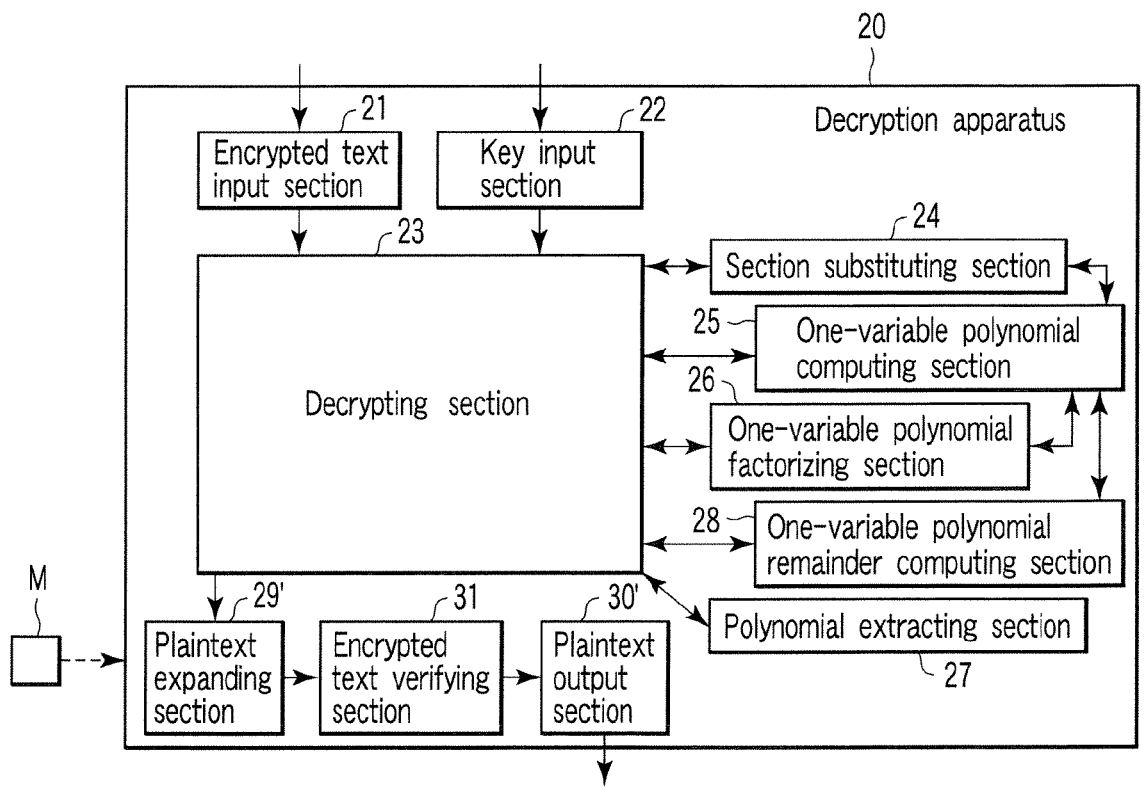
FIG. 9 is an overall configuration diagram of a decryption apparatus according to the second embodiment.

FIG. 8 shows an overall configuration of the encryption apparatus of the second embodiment. FIG. 9 shows an overall configuration of the decryption apparatus of the second embodiment. The same parts as those in FIG. 4 or 5 are indicated by the same reference numerals and a detailed explanation of them will be omitted. What differs from FIG. 4 or 5 will be chiefly described.

The second embodiment is a modification of the first embodiment. As described above, the second embodiment assures higher security and concatenates random number r to plaintext m to produce m∥r and uses the hash value H(m∥r) as a random value.

Specifically, in the encryption apparatus 10, a plaintext embedding section 13', an encrypting section 14', and a polynomial generating section 16' are slightly modified and a random number generating section 18 is added. In the decryption apparatus 20, a plaintext expanding section 29' and a plaintext output section 30' are slightly modified and an encrypted text verifying section 31 is added.

The plaintext embedding function 13' has the function of, when receiving the plaintext (or message) sent from the plaintext input section 11 and the public key sent from the public key input section 12, instructing the random number generating section 18 to generate a random number, the function of concatenating plaintext m to random number r to produce new plaintext M (=m∥r), and the function of, on the basis of the public key, embedding plaintext M as the coefficients of plaintext polynomial M(t) with a variable t and of degree l−1 or less.

Figure 10:
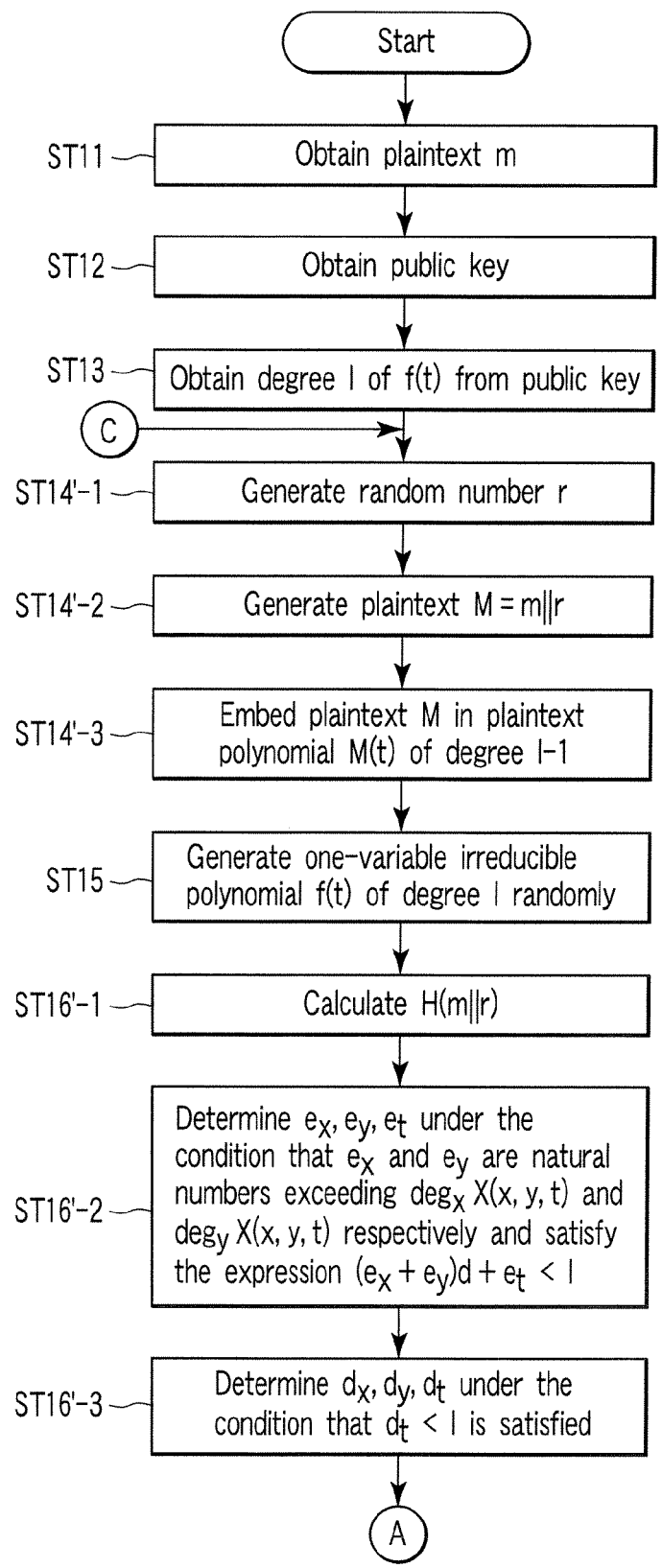
FIGS. 10 to 12 are flowcharts to help explain the flow of processing in the encryption apparatus of the second embodiment.
Figure 11:
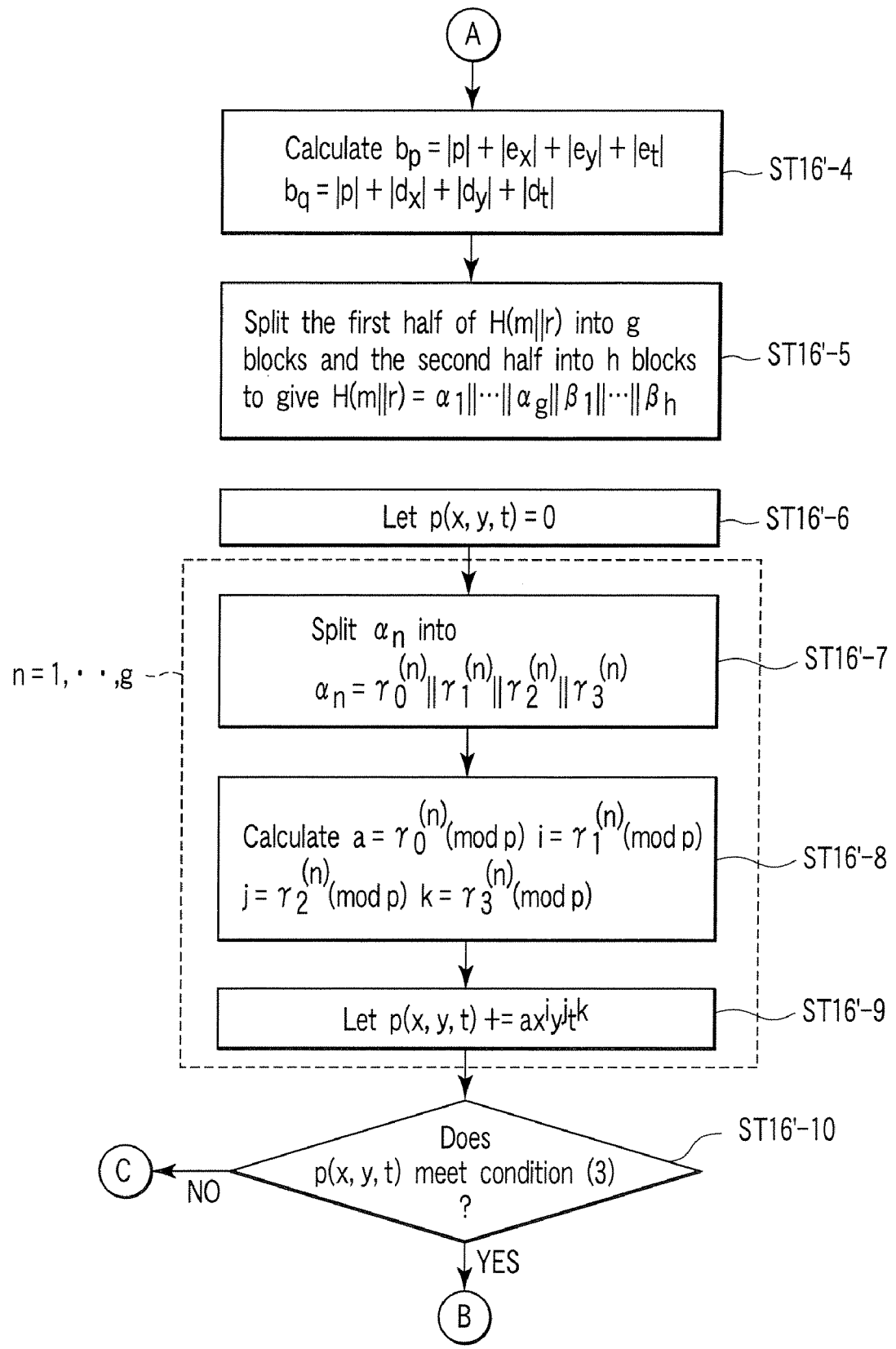
Figure 12:
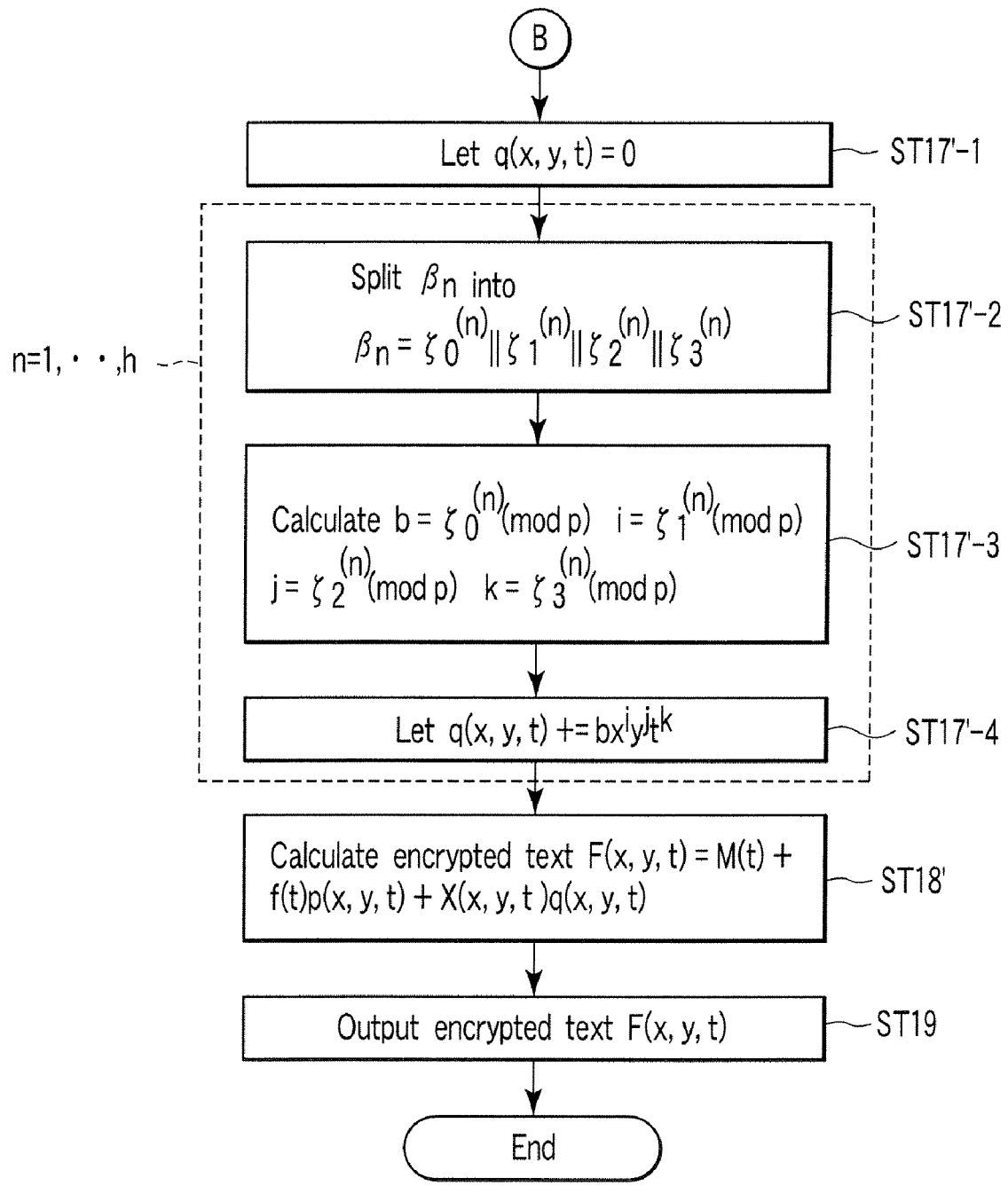

The encrypting section 14' has not only the functions described above but also the function of controlling the polynomial generating section 16' so as to realize the operations shown in FIGS. 10 to 12.

The polynomial generating section 16' is controlled by the encrypting section 14' and generates random polynomials p(x, y, t), q(x, y, t) with three variables x, y, t on the basis of the hash value H(M) of plaintext M. The polynomial generating section 16' has the function of, on the basis of the hash value H(M) of plaintext M, generating at least two of the x exponent, y exponent, t exponent, and coefficients in each term of random polynomials p(x, y, t), q(x, y, t) with three variables.

The random number generating section 18 is controlled by the plaintext embedding section 13' and has the function of generating random number r of a fixed length and the function of sending the generated random number r to the plaintext embedding section 13'.

The plaintext expanding section 29' has the function of extracting plaintext M from the coefficients of plaintext polynomial M(t) received from the decrypting section 23 and the function of sending the plaintext M to the encrypted text verifying section 31.

The plaintext output section 30' has the function of, when the result of determination by the encrypted text verifying section 31 has shown consistency, outputting plaintext M or message m received from the encrypted text verifying section 31 and the function of, when the result of the determination has shown inconsistency, outputting encrypted text invalid information.

The encrypted text verifying section 31 has the function of, on the basis of plaintext M obtained by the plaintext expanding section 29', calculating the hash value H(M) of the plaintext M, the function of storing the obtained hash value H(M) in a memory (not shown), the function of, on the basis of the hash value H(M) in the memory, generating polynomials p(x, y, t), q(x, y, t) with three variables x, y, t, the function of, on the basis of the polynomials p(x, y, t), q(x, y, t), f(t) and fibration X(x, y, t), reproducing encrypted text F'(x, y, t) (=$E_{pk}$(M, p, q, f, X)) by the same process as the encrypting process in the encryption apparatus 10, the function of determining whether the input encrypted text F(x, y, t) coincides with the reproduced encrypted text F'(x, y, t), and the function of controlling the plaintext output section 30' according to the result of the determination.

Next, the operations of the encryption apparatus and decryption apparatus configured as described above will be explained using the flowcharts of FIGS. 10 to 13.

(Encrypting Process: FIGS. 10 to 12)

The processes in step ST11 to step S13 are executed as described above.

Next, the plaintext embedding section 13' instructs the random number generating section 18 to generate random numbers for plaintext m input from the plaintext input section 11. According to the instruction, the random number generating section 18 generates a random number r of a fixed length and transmits it to the plaintext embedding section 13' (ST14'-1).

The plaintext embedding section 13' concatenates the received random number r to plaintext m to generate M(=m∥r) (ST14'-2) and generates plaintext polynomial M(t) using M as a new plaintext by the same process as in the first embodiment (ST14'-3).

Next, the process of generating three-variable polynomials p(x, y, t), q(x, y, t) in the second embodiment will be explained. The encrypting section 14' causes the one-variable irreducible polynomial generating section 15 to generate a one-variable irreducible polynomial f(t) (ST15) and then calculates the hash value H(m∥r) of M (=m∥r) (ST16'-1). Then, the encrypting section 14' transmits p, l, d, e and H(=m∥r) to the polynomial generating section 16'.

On the basis of p, l, d, e and H(=m∥r), the polynomial generating section 16' generates three-variable polynomials p(x, y, t), q(x, y, t) in such a manner that each term in three-variable polynomials p(x, y, t), q(x, y, t) reflects the hash value H (=m∥r). At this time, p(x, y, t) is generated so as to satisfy condition (3) and condition (4) and make the maximum degree e or more. In addition, q(x, y, t) is generated so as to meet condition (5). A concrete generating method is as follows.

Here, $e_x$, $e_y$, and $e_t$ are determined in such a manner that $e_x$ and $e_y$ are natural numbers exceeding $\deg_x X(x, y, t)$ and $\deg_y Y(x, y, t)$, respectively, and satisfy the expression $(e_x+e_y)d+e_t<l$ (ST16'-2). Such $e_x$, $e_y$, and $e_t$ can be determined concretely because l is sufficiently large.

Furthermore, for the generated polynomial q(x, y, t) to meet condition (5), $d_x$, $d_y$, and $d_t$ are determined under the condition $d_t<1$ (ST16'-3). Then, as shown in the following equations, block sizes $b_p$, $b_q$ are determined (ST16'-4):

$$b_p=|p|+|e_x|+|e_y|+|e_t|$$

$$b_q=|p|+|d_x|+|d_y|+|d_t|$$

Here, |a| indicates the bit length of a. In addition, $b_p$ is a block size necessary to generate the term $a_{i,j,k}x^iy^jt^k$ in p(x, y, t). Similarly, $b_q$ is a block size necessary to generate the term $b_{i,j,k}x^iy^jt^k$ in q(x, y, t).

Receiving these, the first half of H(=m||r) is split into g blocks in units of $b_p$ bits and the second half is split into h blocks in units of $b_q$ bits, thereby producing:

$$H(=m\|r)=\alpha_1\|\ldots\|\alpha_g\|\beta_1\|\ldots\|\beta_h \quad (ST16'-5).$$

Next, set p(x, y, t)=0 (ST16'-6). Then, three-variable random polynomial p(x, y, t) is generated so as to fulfill condition (4). Specifically, the individual blocks $\alpha_1\|\alpha_2\|\ldots\|\alpha^g$ of the first half of H(=m||r) is subjected to the operations below repeatedly for n=1, ..., g (ST16'-7 to ST16'-9).

Here, each $\alpha_n$ in a block is divided as follows:

$$\alpha_n=\gamma_0^{(n)}\|\gamma_1^{(n)}\|\gamma_2^{(n)}\|\gamma_3^{(n)}$$

in the following sizes:

$$|\gamma_0|=|p|,|\gamma_1|=|e_x|,|\gamma_2|=|e_y|,|\gamma_3|=|e_t| \quad (ST16'-7)$$

$$a=\gamma_0^{(n)}(\bmod p)$$

$$i=\gamma_1^{(n)}(\bmod e_x)$$

$$j=\gamma_2^{(n)}(\bmod e_y)$$

$$k=\gamma_3^{(n)}(\bmod e_t) \quad (ST16'-8)$$

$$p(x,y,t)+=ax^iy^jt^k \quad (ST16'-9)$$

The symbol "+=" means that the right-hand side is added to the left-hand side.

It is determined whether the p(x, y, t) completed this way satisfies condition (3) (ST16'-10). If it does not satisfy condition (3), the polynomial generating section 16' informs the encrypting section 14' that the p(x, y, t) does not satisfy condition (3).

The encrypting section 14' returns to the state after the completion of step ST13 and instructs the plaintext embedding section 13' to embed plaintext. Hereinafter, the processes in step ST14 to step ST16'-10 are executed again as described above.

On the other hand, suppose the result of determination in step ST16'-10 has shown that p(x, y, t) satisfies condition (3). In this case, set q(x, y, t)=0 (ST17'-1). Then, three-variable random polynomial q(x, y, t) is generated so as to meet condition (5). Specifically, the individual blocks $\beta_1\|\beta_2\|\ldots\|\beta_h$ of the second half of H(=m||r) is subjected to the operations below repeatedly for n=1, ..., h (ST17'-2 to ST17'-4).

Here, each βn in a block is divided as follows:

$$\beta_n=\zeta_0^{(n)}\|\zeta_1^{(n)}\|\zeta_2^{(n)}\|\zeta_3^{(n)}$$

in the following sizes:

$$|\zeta_0|=|p|,|\zeta_1|=|d_x|,|\zeta_2|=|d_y|,|\zeta_3|=|d_t| \quad (ST17'-2)$$

$$b=\zeta_0^{(n)}(\bmod p)$$

$$i=\zeta_1^{(n)}(\bmod d_x)$$

$$j=\zeta_2^{(n)}(\bmod d_y)$$

$$k=\zeta_3^{(n)}(\bmod d_t) \quad (ST17'-3)$$

$$q(x,y,t)+=bx^iy^jt^k \quad (ST17'-4)$$

As a result, three-variable polynomial q(x, y, t) is generated. The polynomial generating section 16' outputs these three-variable polynomials p(x, y, t), q(x, y, t) to the encrypting section 14'.

Using M(t), f(t), p(x, y, g), and q(x, y, t), the encrypting section 14' calculates encrypted text F(x, y, t) on the basis of F(x, y, t)=M(t)+f(t)p(x, y, t)+X(x, y, t)q(x, y, t) (ST18'). The obtained encrypted text F(x, y, t) is output at the encrypted text output section 17 as described above (ST19).

Figure 13:
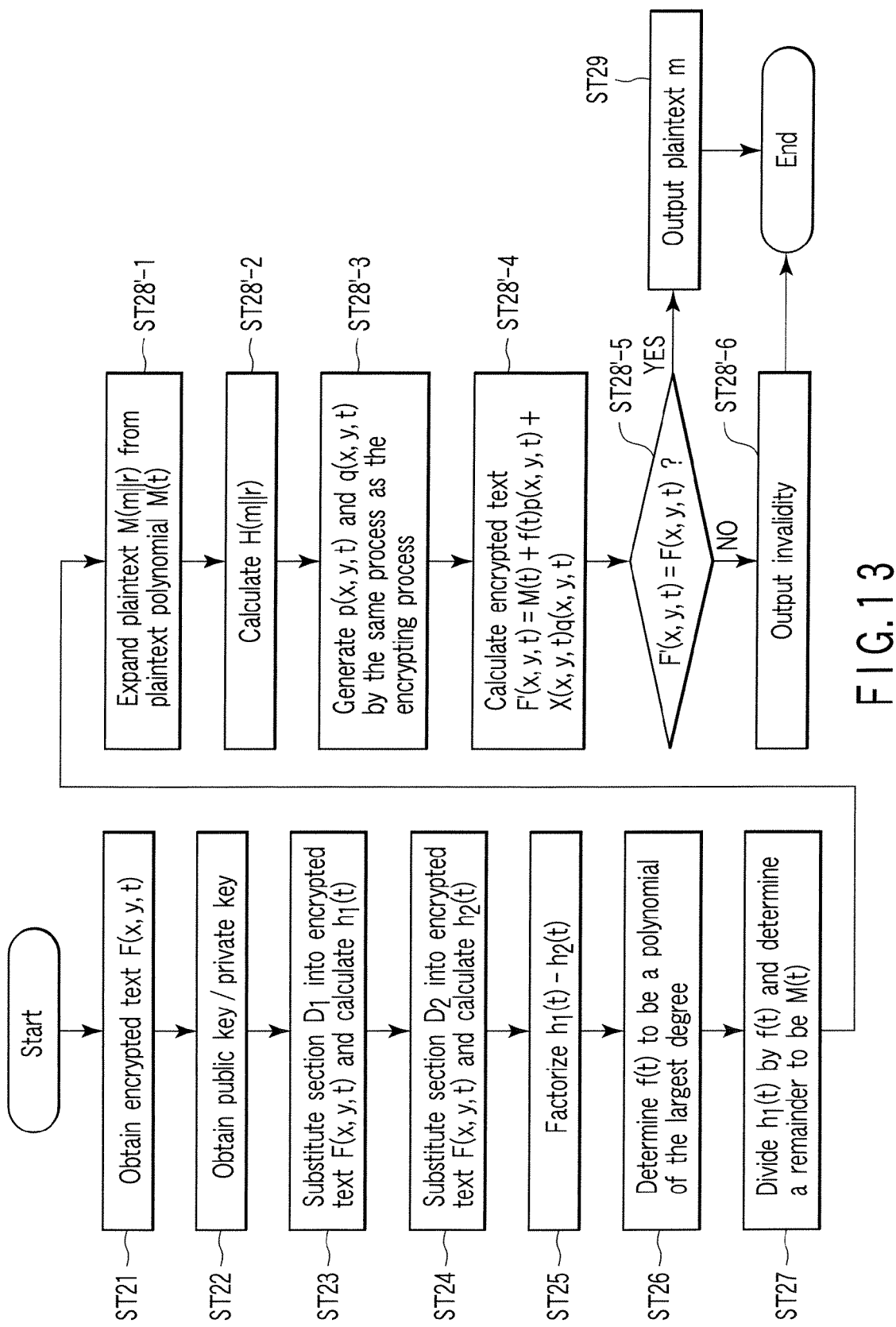
FIG. 13 is a flowchart to help explain the flow of processing in the decryption apparatus of the second embodiment.

(Decrypting Process: FIG. 13)

The processes in step ST21 to step ST27 are carried out as described above. As a result, the decrypting section 23 obtains plaintext polynomial M(t) from plaintext F(x, y, t) input in step ST21.

The decrypting section 23 transmits the plaintext polynomial M(t) to the plaintext expanding section 29'. The plaintext expanding section 29' expands plaintext M from the plaintext polynomial M(t) (ST28'-1) and sends the obtained plaintext M to the encrypted text verifying section 31.

The encrypted text verifying section 31 calculates the hash value H(=m||r) from the plaintext M (ST28'-2) and generates three-variable polynomials p(x, y, t), q(x, y, t) from the obtained H(=m||r) by the same process as the encrypting process in the encryption apparatus 10 (ST28'-3). Next, the encrypted text verifying section 31 reproduces encrypted text F'(x, y, t) on the basis of the three-variable polynomials p(x, y, t), q(x, y, t) and the obtained f(t) and M(t) (ST28'-4).

Thereafter, the encrypted text verifying section 31 determines whether the encrypted text F(x, y, t) input in step ST21 coincides with the encrypted text F'(x, y, t) reproduced in step ST28'-4 (ST28'-5).

If the result of the determination has shown they do not coincide with each other, the encrypted text verifying section 31 informs the plaintext output section 30' that the encrypted text is invalid. Then, the plaintext output section 30' outputs encrypted text invalid information (ST28'-6).

On the other hand, if the result of the determination in step 28'-5 has shown they coincide with each other, the encrypted text verifying section 31 sends plaintext M to the plaintext output section 30'. Then, the plaintext output section 30' converts the plaintext M into real plaintext m and outputs the plaintext m (ST29).

As described above, the second embodiment not only produces the effect of the first embodiment, but also makes it possible to configure a provable secure public-key cryptosystem in terms of IND-CCA more secure than IND-CPA of the first embodiment.

To supplement the explanation, in the second embodiment, plaintext M obtained by concatenating a message m to a random number r is embedded as the coefficients of plaintext polynomial M(t), thereby converting a secure public-key cryptosystem in terms of IND-CPA into a provable secure public-key cryptosystem in terms of IND-CCA. Therefore, according to the second embodiment, it is possible to configure a provable secure public-key cryptosystem in terms of IND-CCA.

Variation of the Second Embodiment

The first to fourth variations described in the first embodiment hold without modification even in the second embodiment. Specifically, a first variation of the second embodiment is such that a part of or all of p, l, d, e in the public keys of the second embodiment are made fixed parameters, thereby reducing the size of the public keys.

A second variation of the second embodiment is such that equation (6) used for encryption is modified as follows: $F(x, y, t)=m(t)-f(t)p(x, y, t)-X(x, y, t)q(x, y, t)$. With this modification, encryption and decryption are performed.

Figure 14:
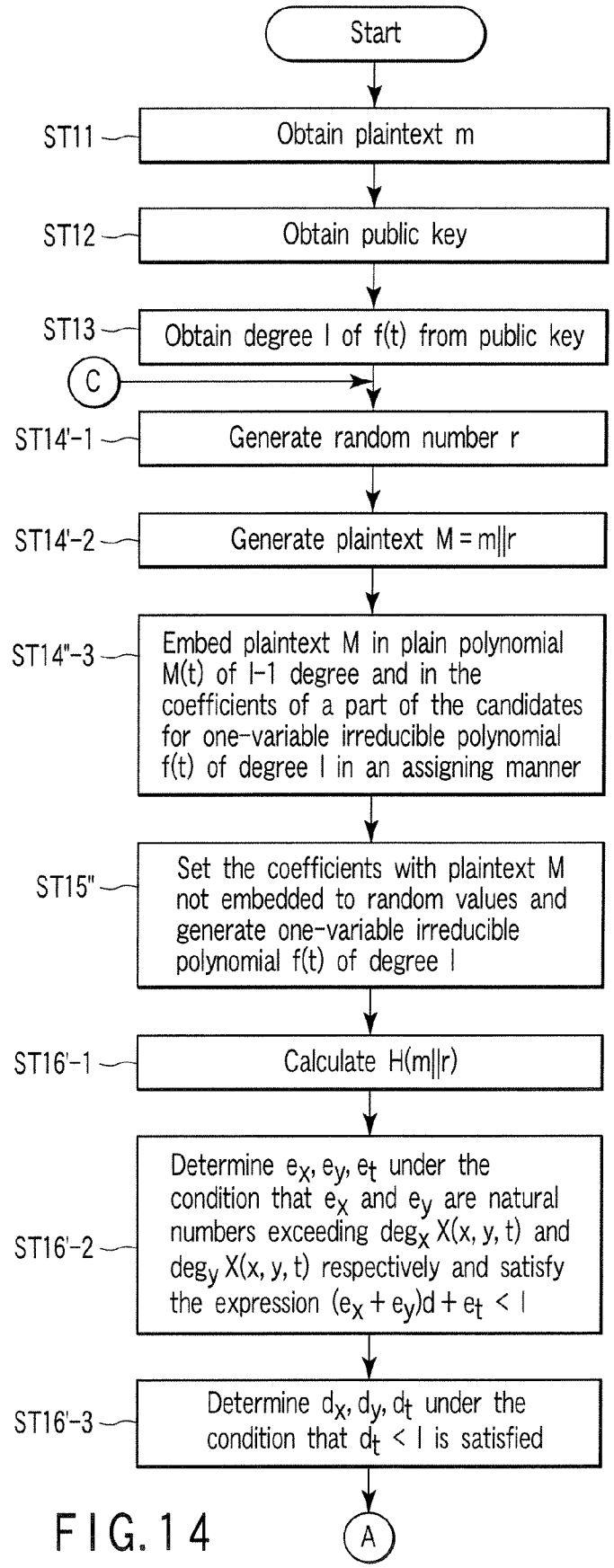
FIG. 14 is a flowchart to help explain a variation of the encryption apparatus of the second embodiment.
Figure 15:
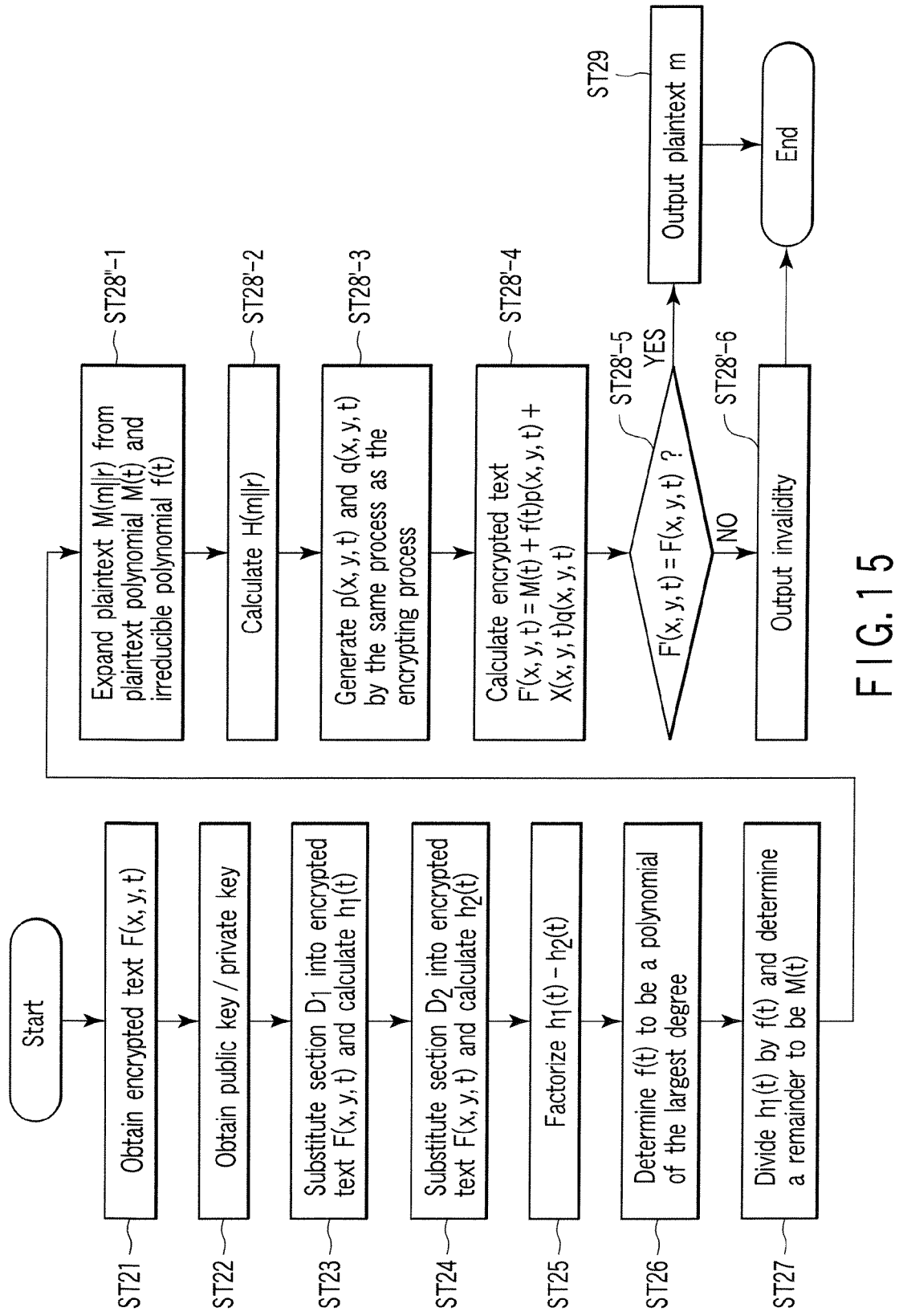
FIG. 15 is a flowchart to help explain a variation of the decryption apparatus of the second embodiment.

A third variation of the second invention is a method of embedding plaintext $M=m\|r$ in a one-variable irreducible polynomial $f(t)$. In this case, the flowchart of the encrypting process and that of decrypting process are modified as shown in FIG. 14 (ST14"-3, ST15") and FIG. 15 (ST28"), respectively. Accordingly, each of the plaintext embedding section 13', one-variable irreducible generating section 15, and plaintext expanding section 29' is modified as follows.

The plaintext embedding section 13' is modified so as to embed plaintext M obtained by concatenating a message m to a random number r in plaintext polynomial M(t) with a variable t and of degree l–1 or less and in the coefficients of a part of the candidates for one-variable irreducible polynomial f(t) of degree l or more in an assigning manner. The one-variable irreducible generating section 15 is modified so as to set those with no plaintext M embedded of the coefficients of the candidates for one-variable irreducible polynomial f(t) to random values and generate one-variable irreducible polynomial f(t). The plaintext expanding section 29' is modified so as to extract plaintext M from the coefficients of plaintext polynomial M(t) and the coefficients of a part of the candidates for irreducible polynomial f(t).

As described above, even in the second embodiment, the first to third variations described in the first embodiment can be used.

The method exhibited in each above-mentioned embodiment can be distributed as a computer executable program by storing into a storage medium such as a magnetic disk [Floppy™ disk, hard disk, etc.], an optical disk (CD-ROM, DVD, etc.), a magnet-optical disk (MO) and a semiconductor memory.

Regardless of type of storage format, any storage medium capable of storing the program and being read by the computer is usable as the storage medium for this program.

An operating system (OS) or middleware (MW) such as a database management software and a network software running on the computer, based on the instruction installed in the computer from the storage medium, may executes a part of each processing to achieve each above-described embodiment.

The storage medium for the invention is not limited to a medium independent from the computer, and includes the storage medium with a program transmitted via a LAN, the Internet, etc., downloaded and stored or temporarily stored thereon.

The number of the storage medium for the invention is not limited only one, and the storage medium of the invention includes the case that processing in each embodiment is respectively executed by means of a plurality of media, and any structure of the medium is acceptable.

The computer in the invention executes each processing in each above mentioned embodiment, based on the program stored in the storage medium. Any configuration of the computer such as a device composed of a single personal computer, etc., and a system composed of a plurality of devices network-connected therein are available.

The computer in the invention is not limited to a personal computer, and includes computing processing device, a micro-computer, etc., included in information processing equipment and generically means equipment and a device capable of achieving the functions of the invention.

The invention in its broader aspects is not limited to the specific details and representative embodiments shown and described herein, and can be embodied in their implementation phases by modifying constituent components without departing from the spirit or scope of the general inventive concept of the invention. A variety of modifications of the invention may be made by appropriate combinations of a plurality of constituent components shown in each foregoing embodiment. For example, some constituent components may be omitted from the whole of the constituent components shown in each embodiment. Furthermore, the constituent components over different embodiments can be appropriately combined.

What is claimed is:

1. An encryption apparatus for encrypting a message m on the basis of a fibration $X(x, y, t)=0$ of an algebraic surface X which is a public key, when private keys for decryption are two or more sections corresponding to fibration $X(x, y, t)=0$ of the algebraic surface X, the encryption apparatus comprising:

an embedding device configured to embed plaintext M obtained by concatenating the message m to a random number r as the coefficients of plaintext polynomial M(t) with a variable t and of degree l–1 or less;

a first polynomial generating device configured to generate random polynomials $p(x, y, t)$ and $q(x, y, t)$ with three variables x, y, and t on the basis of a hash value H(M) of the plaintext M;

a second polynomial generating device configured to generate random one-variable irreducible polynomial f(t) of degree l or more; and an encrypted text generating device configured to generate encrypted text $F=Epk(M, p, q, f, X)$ from the plaintext polynomial M(t) by an encrypting process of performing operations including at least one of addition, subtraction, and multiplication of the polynomials $p(x, y, t)$, $q(x, y, t)$, and $f(t)$ and the fibration $X(x, y, t)=0$ with respect to the plaintext polynomial M(t).

2. The encryption apparatus according to claim 1, wherein the first polynomial generating device generates at least two of the x exponent, y exponent, t exponent, and coefficients in each term of random polynomials $p(x, y, t)$ and $q(x, y, t)$ with three variables x, y, and t on the basis of the hash value H(M) of the plaintext M.

3. An encryption apparatus for encrypting a message m advance on the basis of a fibration $X(x, y, t)=0$ of an algebraic surface X which is a public key, when private keys for decryption are two or more sections corresponding to the fibration $X(x, y, t)=0$ of the algebraic surface X, the encryption apparatus comprising:

an embedding device configured to embed plaintext M obtained by concatenating the message m to a random number r in the coefficients of plaintext polynomial M(t) with a variable t and of degree l–1 or less and in the coefficients of a part of the candidates for one-variable irreducible polynomial f(t) of degree l or more in an assigning manner;

a first polynomial generating device configured to generate random polynomials $p(x, y, t)$ and $q(x, y, t)$ with three variables x, y, and t on the basis of a hash value H(M) of the plaintext M;

a second polynomial generating device configured to generate the one-variable irreducible polynomial f(t) by setting those with the plaintext M not embedded of the coefficients of the candidates for one-variable irreducible polynomial f(t) to random values; and an encrypted text generating device configured to generate encrypted text $F=Epk(M, p, q, f, X)$ from the plaintext polynomial M(t) by an encrypting process of performing operations including at least one of addition, subtraction, and multiplication of the polynomials p(x, y, t), q(x, y, t), and f(t) and the fibration X(x, y, t)=0 with respect to the plaintext polynomial M(t).

4. The encryption apparatus according to claim 3, wherein the first polynomial generating device generates at least two of the x exponent, y exponent, t exponent, and coefficients in each term of random polynomials p(x, y, t) and q(x, y, t) with three variables x, y, and t on the basis of the hash value H(M) of the plaintext M.

5. A decryption apparatus for decrypting a message m from encrypted text F=Epk(M, p, q, f, X) on the basis of two sections D1 and D2 corresponding to a fibration X(x, y, t)=0 of an algebraic surface X which is a private key previously held, when the encrypted text F=Epk(M, p, q, f, X) generated from a plaintext polynomial M(t) by an encrypting process of performing operations including at least one of addition, subtraction, and multiplication of random polynomials p(x, y, t) and q(x, y, t) with three variables x, y, and t, a random one-variable irreducible polynomial f(t) of degree l or more, and a fibration X(x, y, t)=0 of an algebraic surface X which is a public key, with respect to the plaintext polynomial M(t) in which plaintext M obtained by concatenating the message m to a random number r has been embedded as the coefficients of plaintext polynomial M(t) with a variable t and of degree (l−1) or less is input, the decryption apparatus comprising:

a substituting device configured to substitute the sections D1 and D2 into the input encrypted text F to generate two one-variable polynomials $h1(t)$ and $h2(t)$;

a polynomial subtracting device configured to subtract the one-variable polynomials $h1(t)$ and $h2(t)$ from one from the other to obtain the result of subtraction $\{h1(t)-h2(t)\}$;

a factorizing device configured to factorize the result of subtraction $\{h1(t)-h2(t)\}$;

a polynomial extracting device configured to extract an irreducible polynomial f(t) of the highest degree from the result of factorization;

a dividing device configured to divide the one-variable polynomial $h1(t)$ by the irreducible polynomial f(t) to obtain a plaintext polynomial M(t) as a remainder;

a plaintext extracting device configured to extract plaintext M from the coefficients of the plaintext polynomial M(t) obtained by the dividing device;

a hash computing device configured to calculate a hash value H (M) of the plaintext M on the basis of the extracted plaintext M;

a polynomial generating device configured to generate polynomials p(x, y, t) and q(x, y, t) with three variables x, y, and t on the basis of the hash value H(M);

an encrypted text reproducing device configured to reproduce encrypted text F'=Epk(M, p, q, f, X) by the same process as the encrypting process on the basis of the polynomials p(x, y, t), q(x, y, t) and f(t) and the fibration X(x, y, t);

an encrypted text determination device configured to determine whether the input encrypted text F and the reproduced encrypted text F' coincide with each other;

a plaintext output device configured to output the plaintext M or the message m when the result of determination has shown coincidence; and an invalidity output device configured to output encrypted text invalid information when the result of determination by the encrypted text determination device has shown the input encrypted text F and the reproduced encrypted text F' do not coincide with each other.

6. The decryption apparatus according to claim 5, wherein the polynomial generating device generates at least two of the x exponent, y exponent, t exponent, and coefficients in each term of the polynomials p(x, y, t) and q(x, y, t) on the basis of the hash value H(M) of the plaintext M.

7. A decryption apparatus for decrypting a message m from encrypted text F=Epk(M, p, q, f, X) on the basis of two sections D1 and D2 corresponding to fibration X(x, y, t)=0 of an algebraic surface X which is a private key previously held, when the encrypted text F=Epk(M, p, q, f, X) generated from a plaintext polynomial M(t) by an encrypting process of performing operations including at least one of addition, subtraction, and multiplication of random polynomials p(x, y, t) and q(x, y, t) with three variables x, y, and t, a random one-variable irreducible polynomial f(t) of degree l or more, and a fibration X(x, y, t)=0 of an algebraic surface X which is a public key, with respect to the plaintext polynomial M(t) in which plaintext M obtained by concatenating the message m to a random number r has been embedded in the coefficients of plaintext polynomial M(t) with a variable t and of degree (l−1) or less and in the coefficients of a part of the candidates for a one-variable irreducible polynomial f(t) of degree l or more in an assigning manner is input, the decryption apparatus comprising:

a substituting device configured to substitute the sections D1 and D2 into the input encrypted text F to generate two one-variable polynomials $h1(t)$ and $h2(t)$;

a polynomial subtracting device configured to subtract the one-variable polynomials $h1(t)$ and $h2(t)$ from one from the other to obtain the result of subtraction $\{h1(t)-h2(t)\}$;

a factorizing device configured to factorize the result of subtraction $\{h1(t)-h2(t)\}$;

a polynomial extracting device configured to extract an irreducible polynomial f(t) of the highest degree from the result of factorization;

a dividing device configured to divide the one-variable polynomial $h1(t)$ by the irreducible polynomial f(t) to obtain a plaintext polynomial M(t) as a remainder;

a plaintext extracting device configured to extract plaintext M from the coefficients of the plaintext polynomial M(t) obtained by the dividing device and the coefficients of part of the irreducible polynomials f(t) obtained by the polynomial extracting device;

a hash computing device configured to calculate a hash value H (M) of the plaintext M on the basis of the extracted plaintext M;

a polynomial generating device configured to generate polynomials p(x, y, t) and q(x, y, t) with three variables x, y, and t on the basis of the hash value H(M);

an encrypted text reproducing device configured to reproduce encrypted text F'=Epk(M, p, q, f, X) by the same process as the encrypting process on the basis of the polynomials p(x, y, t), q(x, y, t) and f(t) and the fibration X(x, y, t);

an encrypted text determination device configured to determine whether the input encrypted text F and the reproduced encrypted text F' coincide with each other;

a plaintext output device configured to output the plaintext M or the message m when the result of determination has shown coincidence; and an invalidity output device configured to output encrypted text invalid information when the result of determination has shown the input encrypted text F and the reproduced encrypted text F' do not coincide with each other.

8. The decryption apparatus according to claim 7, wherein the polynomial generating device generates at least two of the x exponent, y exponent, t exponent, and coefficients in each term of the polynomials p(x, y, t) and q(x, y, t) on the basis of the hash value H(M) of the plaintext M.

9. A program which is stored in a computer-readable storage medium used in an encryption apparatus for encrypting a message m on the basis of a fibration X(x, y, t)=0 of an algebraic surface X which is a public key, when private keys for decryption are two or more sections corresponding to fibration X(x, y, t)=0 of the algebraic surface X, the program comprising:

first program code which causes the computer to execute sequentially the process of holding an input message m temporarily in a memory and sending the message;

second program code which causes the computer to execute sequentially the process of generating a random number r;

third program code which causes the computer to execute sequentially the process of embedding plaintext M obtained by concatenating the sent message m to the generated random number r as the coefficients of plaintext polynomial M(t) with a variable t and of degree l−1 or less;

fourth program code which causes the computer to execute sequentially the process of generating random polynomials p(x, y, t) and q(x, y, t) with three variables x, y, and t on the basis of a hash value H(M) of the plaintext M;

fifth program code which causes the computer to execute sequentially the process of generating random one-variable irreducible polynomial f(t) of degree l or more; and sixth program code which causes the computer to execute sequentially the process of generating encrypted text F=Epk(M, p, q, f, X) from the plaintext polynomial M(t) by an encrypting process of performing operations including at least one of addition, subtraction, and multiplication of the polynomials p(x, y, t), q(x, y, t), and f(t) and the fibration X(x, y, t)=0 with respect to the plaintext polynomial M(t).

10. The program according to claim 9, wherein the fourth program code causes the computer to execute sequentially the process of generating at least two of the x exponent, y exponent, t exponent, and coefficients in each term of random polynomials p(x, y, t) and q(x, y, t) with three variables x, y, and t on the basis of hash value H(M) of the plaintext M.

11. A program which is stored in a computer-readable storage medium used in an encryption apparatus for encrypting a message m on the basis of a fibration X(x, y, t)=0 of an algebraic surface X which is a public key, when private keys for decryption are two or more sections corresponding to fibration X(x, y, t)=0 of the algebraic surface X, the program comprising:

first program code which causes the computer to execute sequentially the process of holding an input message m temporarily in a memory and sending the message;

second program code which causes the computer to execute sequentially the process of generating a random number r;

third program code which causes the computer to execute sequentially the process of to embedding plaintext M obtained by concatenating the sent message m to the generated random number r in the coefficients of plaintext polynomial M(t) with a variable t and of degree l−1 or less and in the coefficients of a part of the candidates for one-variable irreducible polynomial f(t) of degree l or more in an assigning manner;

fourth program code which causes the computer to execute sequentially the process of generating random polynomials p(x, y, t) and q(x, y, t) with three variables x, y, and t on the basis of a hash value H(M) of the plaintext M;

fifth program code which causes the computer to execute sequentially the process of generating the one-variable irreducible polynomial f(t) by setting those with the plaintext M not embedded of the coefficients of the candidates for one-variable irreducible polynomial f(t) to random values; and sixth program code which causes the computer to execute sequentially the process of generating encrypted text F=Epk(M, p, q, f, X) from the plaintext polynomial M(t) by an encrypting process of performing operations including at least one of addition, subtraction, and multiplication of the polynomials p(x, y, t), q(x, y, t), and f(t) and the fibration X(x, y, t)=0 with respect to the plaintext polynomial M(t).

12. The program according to claim 11, wherein the fourth program code causes the computer to execute sequentially the process of generating at least two of the x exponent, y exponent, t exponent, and coefficients in each term of random polynomials p(x, y, t) and q(x, y, t) with three variables x, y, and t on the basis of hash value H(M) of the plaintext M.

13. A program which is stored in a computer-readable storage medium used in a decryption apparatus for, when encrypted text F=Epk(M, p, q, f, X) generated from a plaintext polynomial M(t) by an encrypting process of performing operations including at least one of addition, subtraction, and multiplication of random polynomials p(x, y, t) and q(x, y, t) with three variables x, y, and t, a random one-variable irreducible polynomial f(t) of degree l or more, and a fibration X(x, y, t)=0 of an algebraic surface X which is a public key, with respect to the plaintext polynomial M(t) in which plaintext M obtained by concatenating a message m to a random number r has been embedded as the coefficients of plaintext polynomial M(t) with a variable t and of degree (l−1) or less is input, decrypting the message m from the encrypted text F on the basis of two sections D1 and D2 corresponding to fibration X(x, y, t)=0 of an algebraic surface X which is a private key previously held, the program comprising:

first program code which causes the computer to execute sequentially the process of generating two one-variable polynomials $h1(t)$ and $h2(t)$ by substituting the sections D1 and D2 into the input encrypted text F;

second program code which causes the computer to execute sequentially the process of subtracting the one-variable polynomials $h1(t)$ and $h2(t)$ from one from the other to obtain the result of subtraction $\{h1(t)-h2(t)\}$;

third program code which causes the computer to execute sequentially the process of factorizing the result of subtraction $\{h1(t)-h2(t)\}$;

fourth program code which causes the computer to execute sequentially the process of extracting an irreducible polynomial f(t) of the highest degree from the result of factorization;

fifth program code which causes the computer to execute sequentially the process of dividing one-variable polynomial $h1(t)$ by the irreducible polynomial f(t) to obtain a plaintext polynomial M(t) as a remainder;

sixth program code which causes the computer to execute sequentially the process of extracting plaintext M from the coefficients of the obtained plaintext polynomial M(t);

seventh program code which causes the computer to execute sequentially the process of calculating a hash value H (M) of the plaintext M on the basis of the extracted plaintext M and holding it in a memory;

eighth program code which causes the computer to execute sequentially the process of generating polynomials $p(x, y, t)$ and $q(x, y, t)$ with three variables x, y, and t on the basis of the hash value H(M) in the memory;

ninth program code which causes the computer to execute sequentially the process of reproducing encrypted text $F'=Epk(M, p, q, f, X)$ by the same process as the encrypting process on the basis of the polynomials $p(x, y, t)$, $q(x, y, t)$ and $f(t)$ and the fibration $X(x, y, t)$;

tenth program code which causes the computer to execute sequentially the process of determining whether the input encrypted text F and the reproduced encrypted text F' coincide with each other;

eleventh program code which causes the computer to execute sequentially the process of outputting the plaintext M or the message m when the result of determination has shown coincidence; and twelfth program code which causes the computer to execute sequentially the process of outputting encrypted text invalid information when the result of determination has shown the input encrypted text F and the reproduced encrypted text F' do not coincide with each other.

14. The program according to claim 13, wherein the eighth program code causes the computer to execute sequentially the process of generating at least two of the x exponent, y exponent, t exponent, and coefficients in each term of the polynomials $p(x, y, t)$ and $q(x, y, t)$ on the basis of the hash value H(M) of the plaintext M.

15. A program which is stored in a computer-readable storage medium used in a decryption apparatus for, when encrypted text $F=Epk(M, p, q, f, X)$ generated from a plaintext polynomial M(t) by an encrypting process of performing operations including at least one of addition, subtraction, and multiplication of random polynomials $p(x, y, t)$ and $q(x, y, t)$ with three variables x, y, and t, a random one-variable irreducible polynomial f(t) of degree l or more, and a fibration $X(x, y, t)=0$ of an algebraic surface X which is a public key, with respect to the plaintext polynomial M(t) in which plaintext M obtained by concatenating a message m to a random number r has been embedded in the coefficients of plaintext polynomial M(t) with a variable t and of degree (l−1) or less and in the coefficients of a part of the candidates for a one-variable irreducible polynomial f(t) of degree l or more in an assigning manner is input, decrypting the message m from the encrypted text F on the basis of two sections D1 and D2 corresponding to fibration $X(x, y, t)=0$ of an algebraic surface X which is a private key previously held, the program comprising:

first program code which causes the computer to execute sequentially the process of generating two one-variable polynomials $h1(t)$ and $h2(t)$ by substituting the sections D1 and D2 into the input encrypted text F;

second program code which causes the computer to execute sequentially the process of subtracting the one-variable polynomials $h1(t)$ and $h2(t)$ from one from the other to obtain the result of subtraction $\{h1(t)-h2(t)\}$;

third program code which causes the computer to execute sequentially the process of factorizing the result of subtraction $\{h1(t)-h2(t)\}$;

fourth program code which causes the computer to execute sequentially the process of extracting an irreducible polynomial f(t) of the highest degree from the result of factorization;

fifth program code which causes the computer to execute sequentially the process of dividing one-variable polynomial $h1(t)$ by the irreducible polynomial f(t) to obtain a plaintext polynomial M(t) as a remainder;

sixth program code which causes the computer to execute sequentially the process of extracting plaintext M from the coefficients of the obtained plaintext polynomial M(t) and the coefficients of a part of the extracted irreducible polynomials f(t);

seventh program code which causes the computer to execute sequentially the process of calculating a hash value H (M) of the plaintext M on the basis of the extracted plaintext M and storing it in a memory;

eighth program code which causes the computer to execute sequentially the process of generating polynomials $p(x, y, t)$ and $q(x, y, t)$ with three variables x, y, and t on the basis of the hash value H(M) in the memory;

ninth program code which causes the computer to execute sequentially the process of reproducing encrypted text $F'=Epk(M, p, q, f, X)$ by the same process as the encrypting process on the basis of the polynomials $p(x, y, t)$, $q(x, y, t)$ and $f(t)$ and the fibration $X(x, y, t)$;

tenth program code which causes the computer to execute sequentially the process of determining whether the input encrypted text F and the reproduced encrypted text F' coincide with each other;

eleventh program code which causes the computer to execute sequentially the process of outputting the plaintext M or the message m when the result of determination has shown coincidence; and twelfth program code which causes the computer to execute sequentially the process of outputting encrypted text invalid information when the result of determination has shown the input encrypted text F and the reproduced encrypted text F' do not coincide with each other.

16. The program according to claim 15, wherein the eighth program code causes the computer to execute sequentially the process of generating at least two of the x exponent, y exponent, t exponent, and coefficients in each term of the polynomials $p(x, y, t)$ and $q(x, y, t)$ on the basis of the hash value H(M) of the plaintext M.

17. An encryption method which is executed by an encryption apparatus for encrypting a message m on the basis of a fibration $X(x, y, t)=0$ of an algebraic surface X which is a public key, when private keys for decryption are two or more sections corresponding to fibration $X(x, y, t)=0$ of the algebraic surface X, the encryption method comprising:

embedding plaintext M obtained by concatenating the message m to a random number r as the coefficients of plaintext polynomial M(t) with a variable t and of degree l−1 or less;

generating random polynomials $p(x, y, t)$ and $q(x, y, t)$ with three variables x, y, and t on the basis of a hash value H(M) of the plaintext M;

generating random one-variable irreducible polynomial f(t) of degree l or more; and generating encrypted text $F=Epk(M, p, q, f, X)$ from the plaintext polynomial M(t) by an encrypting process of performing operations including at least one of addition, subtraction, and multiplication of the polynomials $p(x, y, t)$, $q(x, y, t)$, and f(t) and the fibration $X(x, y, t)=0$ with respect to the plaintext polynomial M(t).

18. The encryption method according to claim 17, wherein the act of generating polynomials $p(x, y, t)$ and $q(x, y, t)$ includes generating at least two of the x exponent, y exponent, t exponent, and coefficients in each term of random polynomials $p(x, y, t)$ and $q(x, y, t)$ with three variables x, y, and t on the basis of hash value H(M) of the plaintext M.

19. An encryption method which is executed by an encryption apparatus for encrypting a message m on the basis of a fibration $X(x, y, t)=0$ of an algebraic surface X which is a public key, when private keys for decryption are two or more sections corresponding to the fibration $X(x, y, t)=0$ of the algebraic surface X, the encryption method comprising:

embedding plaintext M obtained by concatenating the message m to a random number r in the coefficients of plaintext polynomial M(t) with a variable t and of degree l−1 or less and in the coefficients of a part of the candidates for one-variable irreducible polynomial f(t) of degree l or more in an assigning manner;

generating random polynomials $p(x, y, t)$ and $q(x, y, t)$ with three variables x, y, and t on the basis of a hash value H(M) of the plaintext M;

generating the one-variable polynomial f(t) by setting those with the plaintext M not embedded of the coefficients of the candidates for the one-variable irreducible polynomial f(t) to random values; and generating encrypted text $F=Epk(M, p, q, f, X)$ from the plaintext polynomial M(t) by an encrypting process of performing operations including at least one of addition, subtraction, and multiplication of the polynomials $p(x, y, t)$, $q(x, y, t)$, and f(t) and the fibration $X(x, y, t)=0$ with respect to the plaintext polynomial M(t).

20. The encryption method according to claim 19, wherein the act of generating polynomials $p(x, y, t)$ and $q(x, y, t)$ includes generating at least two of the x exponent, y exponent, t exponent, and coefficients in each term of random polynomials $p(x, y, t)$ and $q(x, y, t)$ with three variables x, y, and t on the basis of the hash value H(M) of the plaintext M.

21. A decryption method which is executed by a decryption apparatus for decrypting a message m from encrypted text $F=Epk(M, p, q, f, X)$ on the basis of two sections D1 and D2 corresponding to fibration $X(x, y, t)=0$ of an algebraic surface X which is a private key previously held, when the encrypted text $F=Epk(M, p, q, f, X)$ generated from a plaintext polynomial M(t) by an encrypting process of performing operations including at least one of addition, subtraction, and multiplication of random polynomials $p(x, y, t)$ and $q(x, y, t)$ with three variables x, y, and t, a random one-variable irreducible polynomial f(t) of degree l or more, and a fibration $X(x, y, t)=0$ of an algebraic surface X which is a public key with respect to the plaintext polynomial M(t) in which plaintext M obtained by concatenating the message m to a random number r has been embedded as the coefficients of plaintext polynomial M(t) with a variable t and of degree (l−1) or less is input, the decryption method comprising:

generating two one-variable polynomials $h1(t)$ and $h2(t)$ by substituting the sections D1 and D2 into the input encrypted text F;

subtracting the one-variable polynomials $h1(t)$ and $h2(t)$ from one from the other to obtain the result of subtraction $\{h1(t)-h2(t)\}$;

factorizing the result of subtraction $\{h1(t)-h2(t)\}$;

extracting an irreducible polynomial f(t) of the highest degree from the result of factorization;

dividing one-variable polynomial $h1(t)$ by the irreducible polynomial f(t) to obtain a plaintext polynomial M(t) as a remainder;

extracting plaintext M from the coefficients of the obtained plaintext polynomial M(t);

calculating a hash value H(M) of the plaintext M on the basis of the extracted plaintext M;

generating polynomials $p(x, y, t)$ and $q(x, y, t)$ with three variables x, y, and t on the basis of the hash value H(M);

reproducing encrypted text $F'=Epk(M, p, q, f, X)$ by the same process as the encrypting process on the basis of the polynomials $p(x, y, t)$, $q(x, y, t)$ and f(t) and the fibration $X(x, y, t)$;

determining whether the input encrypted text F and the reproduced encrypted text F' coincide with each other;

outputting the plaintext M or the message m when the result of determination has shown coincidence; and outputting encrypted text invalid information when the result of determination has shown the input encrypted text F and the reproduced encrypted text F' do not coincide with each other.

22. The decryption method according to claim 21, wherein the act of generating polynomials $p(x, y, t)$ and $q(x, y, t)$ includes generating at least two of the x exponent, y exponent, t exponent, and coefficients in each term of the polynomials $p(x, y, t)$ and $q(x, y, t)$ on the basis of the hash value H(M) of the plaintext M.

23. A decryption method which is executed by a decryption apparatus for decrypting a message m from encrypted text $F=Epk(M, p, q, f, X)$ on the basis of two sections D1 and D2 corresponding to fibration $X(x, y, t)=0$ of an algebraic surface X which is a private key previously held, when the encrypted text $F=Epk(M, p, q, f, X)$ generated from a plaintext polynomial M(t) by an encrypting process of performing operations including at least one of addition, subtraction, and multiplication of random polynomials $p(x, y, t)$ and $q(x, y, t)$ with three variables x, y, and t, a random one-variable irreducible polynomial f(t) of degree l or more, and a fibration $X(x, y, t)=0$ of an algebraic surface X which is a public key, with respect to the plaintext polynomial M(t) in which plaintext M obtained by concatenating the message m to a random number r has been embedded in the coefficients of plaintext polynomial M(t) with a variable t and of degree (l−1) or less and in the coefficients of a part of the candidates for a one-variable irreducible polynomial f(t) of degree l or more in an assigning manner is input, the decryption method comprising:

generating two one-variable polynomials $h1(t)$ and $h2(t)$ by substituting the sections D1 and D2 into the input encrypted text F;

subtracting the one-variable polynomials $h1(t)$ and $h2(t)$ from one from the other to obtain the result of subtraction $\{h1(t)-h2(t)\}$;

factorizing the result of subtraction $\{h1(t)\ h2(t)\}$;

extracting an irreducible polynomial f(t) of the highest degree from the result of factorization;

dividing one-variable polynomial $h1(t)$ by the irreducible polynomial f(t) to obtain a plaintext polynomial M(t) as a remainder;

extracting plaintext M from the coefficients of the obtained plaintext polynomial M(t) and the coefficients of a part of the extracted irreducible polynomials f(t);

calculating a hash value H (M) of the plaintext M on the basis of the extracted plaintext M;

generating polynomials $p(x, y, t)$ and $q(x, y, t)$ with three variables x, y, and t on the basis of the hash value H(M);

reproducing encrypted text $F'=Epk(M, p, q, f, X)$ by the same process as the encrypting process on the basis of the polynomials $p(x, y, t)$, $q(x, y, t)$ and f(t) and the fibration $X(x, y, t)$;

determining whether the input encrypted text F and the reproduced encrypted text F' coincide with each other;

outputting the plaintext M or the message m when the result of determination has shown coincidence; and outputting encrypted text invalid information when the result of determination has shown the input encrypted text F and the reproduced encrypted text F' do not coincide with each other.

24. The decryption method according to claim 23, wherein the act of generating polynomials p(x, y, t) and q(x, y, t) includes generating at least two of the x exponent, y exponent, t exponent, and coefficients in each term of the polynomials p(x, y, t) and q(x, y, t) on the basis of the hash value H(M) of the plaintext M.

* * * * *